(12) United States Patent
Felt

(10) Patent No.: US 7,317,457 B2
(45) Date of Patent: Jan. 8, 2008

(54) PROCESSING IMAGE DATA

(75) Inventor: Adam C. Felt, Reno, NV (US)

(73) Assignee: Autodesk, Inc., San Rafael, CA (US)

( * ) Notice: Subject to any disclaimer, the term of this patent is extended or adjusted under 35 U.S.C. 154(b) by 604 days.

(21) Appl. No.: 10/894,485

(22) Filed: Jul. 20, 2004

(65) Prior Publication Data

US 2007/0159487 A1    Jul. 12, 2007

Related U.S. Application Data

(60) Provisional application No. 60/488,832, filed on Jul. 21, 2003.

(51) Int. Cl.
*G06T 15/00* (2006.01)
(52) U.S. Cl. .................. 345/473; 707/102; 707/104
(58) Field of Classification Search ............. 345/473, 345/474, 475; 707/102, 104
See application file for complete search history.

(56) References Cited

U.S. PATENT DOCUMENTS 5,692,117 A    11/1997   Berend et al. ............. 345/475
5,999,194 A    12/1999   Brunelle .................... 345/473
6,119,123 A *   9/2000   Elenbaas et al. ........... 707/102
6,768,489 B2 *  7/2004   Jeong et al. ................ 345/474

FOREIGN PATENT DOCUMENTS

EP    0811954 A3    7/1999

* cited by examiner

*Primary Examiner*—Phu K. Nguyen
(74) *Attorney, Agent, or Firm*—Patterson & Sheridan, LLP

(57) ABSTRACT

A method of processing image data, in which object data is associated with animation data. The animation data has a plurality of keyframes, and each keyframe has a time value, an animation value and two handles. Adjacent keyframes are interpolated to produce a curve that does not overshoot animation values of either of the adjacent keyframes ensuring a smooth transition between the adjacent keyframes. When the position of a selected keyframe is changed in response to an input command, a slope and a magnitude corresponding to each handle of the selected keyframe are recalculated. Furthermore, a slope and a magnitude corresponding to each handle of a keyframe immediately before and a keyframe immediately after the selected keyframe are recalculated.

17 Claims, 22 Drawing Sheets

| 802 KEY ID | 803 TIME VALUE | 804 ANIMATION VALUE | 805 IN HANDLE SLOPE | 806 IN HANDLE MAGNITUDE | 807 OUT HANDLE SLOPE | 808 OUT HANDLE MAGNITUDE | 809 STATE |
|---|---|---|---|---|---|---|---|
| 0000 | 0 | 42 | - | - | 0.00 | 6 | AUTO |
| 0001 | 18 | 39 | 0.47 | 6 | -0.47 | 10.7 | AUTO |
| 0002 | 50 | 9 | 0.00 | 10.7 | 0.00 | 5.3 | AUTO |
| 0003 | 66 | 30 | -1.62 | 5.3 | 1.62 | 3.3 | AUTO |
| 0004 | 76 | 51 | 0.00 | 3.3 | 0.00 | 5.3 | AUTO |
| 0005 | 92 | 10 | 0.00 | 5.3 | 0.00 | 12.3 | AUTO |
| 0006 | 129 | 12 | -0.05 | 12.3 | 0.05 | 6.7 | AUTO |
| 0007 | 149 | 20 | 0.00 | 6.7 | - | - | AUTO |

*Figure 8*

PROCESSING IMAGE DATA

CROSS-REFERENCE TO RELATED APPLICATIONS

This application claims benefit of U.S. provisional patent application Ser. No. 60/488,832, filed Jul. 21, 2003, which is herein incorporated by reference.

BACKGROUND OF THE INVENTION

1. Field of the Invention

Embodiments of the present invention generally relate to processing image data to interpolate keyframes.

2. Description of the Related Art

Image data processing systems may receive program instructions for character animation, in which character data (describing the nature of a character) is associated with animation data, specifying character movements. The animation data may consist of a plurality of keyframes, each of which may have an animation value and two handles. The handles provide for the control of spline curves used for interpolating between keyframes. Spline curves generally ensure smooth transitions between keyframes, but it is possible for these curves to introduce other undesirable artifacts.

SUMMARY OF THE INVENTION

The present. invention processes image data, in which object data is associated with animation data. The animation data has a plurality of keyframes, and each keyframe has a time value, an animation value and two handles. Animation values of adjacent keyframes are interpolated to produce a curve that does not overshoot animation values of either of the adjacent keyframes ensuring a smooth transition between the adjacent keyframes.

Various embodiments of the invention include a computer readable medium storing instructions for causing a computer to process image data and produce a modified curve representing animation data, by performing the steps of (i) receiving an input specifying a modification to a first keyframe indicator, the first keyframe indicator including a first handle extending from the first keyframe indicator to a first control point partially defining a first curve, (ii) identifying a second keyframe indicator connected to the first keyframe indicator by the first curve, the second keyframe indicator including a second handle extending from the second keyframe indicator to a second control point partially defining the first curve, (iii) adjusting the first handle and the second handle based on the modification to produce a modified first handle and a modified second handle, and (iv) computing a modified first curve between the first keyframe indicator and the second keyframe indicator based on the modified first handle and the modified second handle, wherein the modified first curve does not overshoot the second keyframe indicator.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 8 shows a track table, according to one embodiment of the present invention;

DETAILED DESCRIPTION

Figure 1:
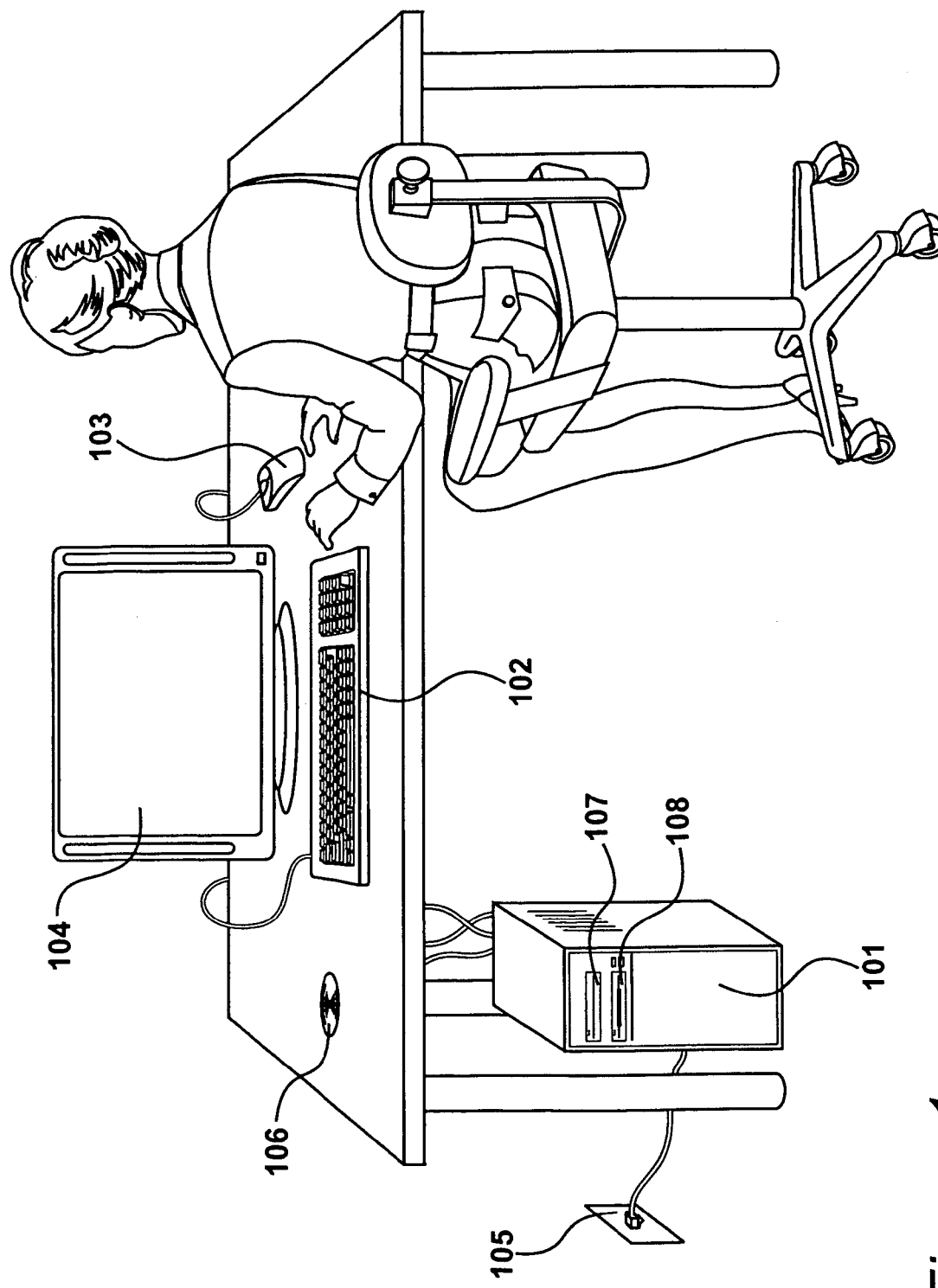
FIG. 1 shows an environment for processing three dimensional image data, according to one embodiment of the present invention.

FIG. 1 shows an environment for processing three dimensional image data, according to one embodiment of the present invention. Data processing is affected by a programmable computer system 101 that responds to input data from a user via a keyboard 102, and a mouse 103, or similar manually operable input devices. Output data from computer system 101 is displayed to the user via a visual display unit 104. A network connection 105 allows the computer system 101 to communicate with a local server and also facilitates communication externally via the internet.

Computer system 101 receives input data from the keyboard 102 and other input devices via cable connections although in alternative embodiments radio interfaces could be provided. Many different types of programmable computer system 101 could be deployed and in alternative embodiments the functionality could be provided using dedicated hardware.

Instructions executable by computer system 101 are installed via an instruction carrying medium such as a CD-ROM 106 or a similar instruction carrying medium such as a DVD etc. The computer system 101 may also have devices for recording output data, such as CD-ROM burners or DVD burner 107 or removable magnetic disk storage device 108, for example.

Figure 2:
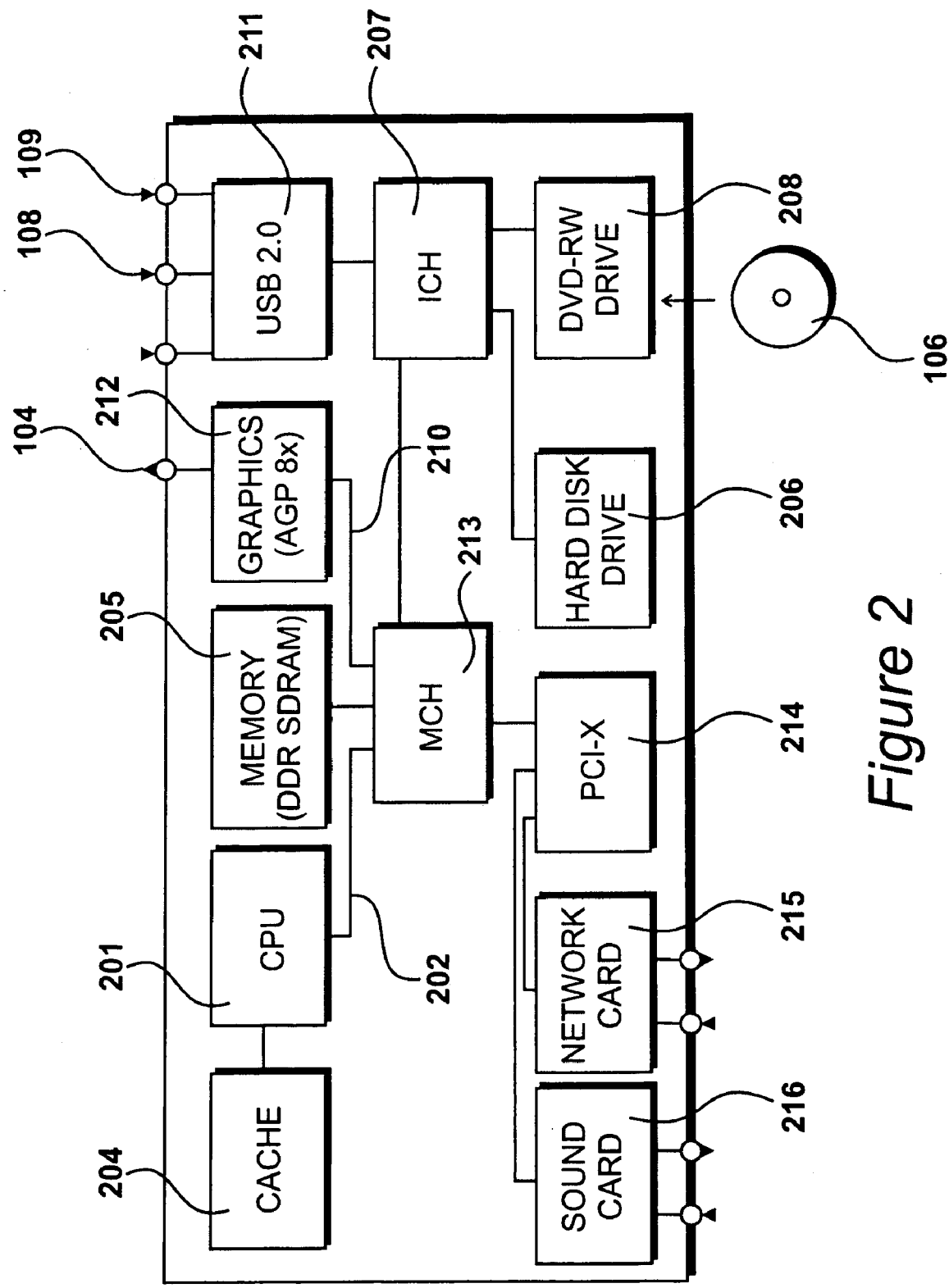
FIG. 2 details components of the computer system shown in FIG. 1, according to one embodiment of the present invention.

FIG. 2 is a block diagram including the components of computer system 101, according to one embodiment of the present invention. In some embodiments of the present invention, the components are based upon the Intel® E7505 hub-based Chipset.

The system includes an Intel® Pentium™ Xeon™ DP central processing unit (CPU) 201 running at three Gigahertz (3 GHz), which fetches instructions for execution and manipulates data via an Intel® E7505 533 Megahertz system bus 202 providing connectivity with a Memory Controller Hub (MCH) 203. The CPU 201 has a secondary cache 204 comprising five hundred and twelve kilobytes of high speed static RAM, for storing frequently-accessed instructions and data to reduce fetching operations from a larger main memory 205 via the memory controller hub 203. The memory controller hub 203 thus co-ordinates data and instruction flow with the main memory 205, which is at least one gigabyte in storage capacity, in this embodiment of the present invention. Instructions and data are thus stored in the main memory 205 and the cache 204 for swift access by the CPU 201.

A hard disk drive 206 provides non-volatile bulk storage of instructions and data via an Input/Output Controller Hub (ICH) 207. The controller hub 207 also provides connectivity to storage devices 108 and 109, as shown in FIG. 1. USB 2.0 interface 211 also provides connectivity to manually operable input devices, such as 102, 103 and 104.

A graphics card 212 receives graphic data and instructions from the CPU 201. The graphics card 212 is connected to the memory controller hub 203 by means of a high speed AGP graphics bus 213. A PCI interface 214 provides connections to a network card 215 that provides access to the network connection 106, over which instructions and or data may be transferred. A sound card 216 is also connected to the PCI interface 214 and receives sound data or instructions from the CPU 201.

The equipment shown in FIG. 2 constitutes the components of a high-end IBM™ PC compatible processing system. In an alternative embodiment of the present invention, similar functionality is achieved using an Apple™ PowerPC™ architecture-based processing system.

Figure 3:
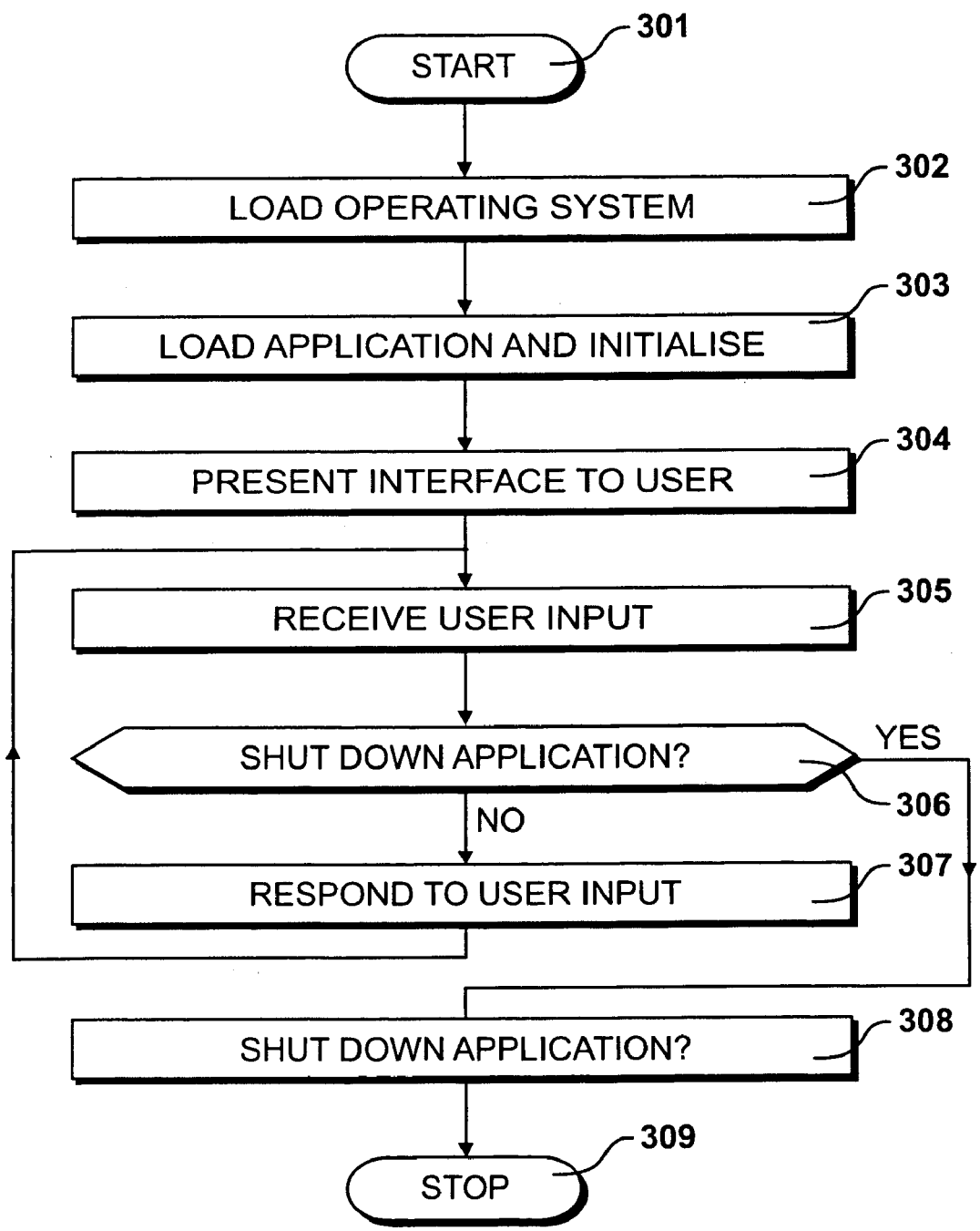
FIG. 3 illustrates operations performed by the system shown in Figure, according to one embodiment of the present invention.

FIG. 3 illustrates operations performed by the system shown in FIG. 2, according to one embodiment of the present invention. After starting operation at step 301, instructions defining an operating system are loaded at step 302. In one embodiment of the present invention, the operating system is Microsoft™ Windows™ but in alternative embodiments of the present invention, other operating systems may be used such as MacX™ or Linux, for example.

At step 303 instructions for the application of an embodiment of the present invention are loaded and initialised resulting in a user interface being displayed at step 304.

At step 305 a user input command is received either in response to operation of keyboard 102 or in response to operation of the mouse 104.

At step 306 a question is asked as to whether a shutdown command has been received and if this is answered in the affirmative the application is shut down at step 308 and the procedure is stopped 309. Alternatively, if the question asked at step 306 is answered in the negative, the application responds to the user input (received at step 305) at step 307. Thereafter, further input commands are received at step 305 and further responses are made at step 307 until a shutdown command is received and the question asked at step 306 is answered in the affirmative.

Figure 4:
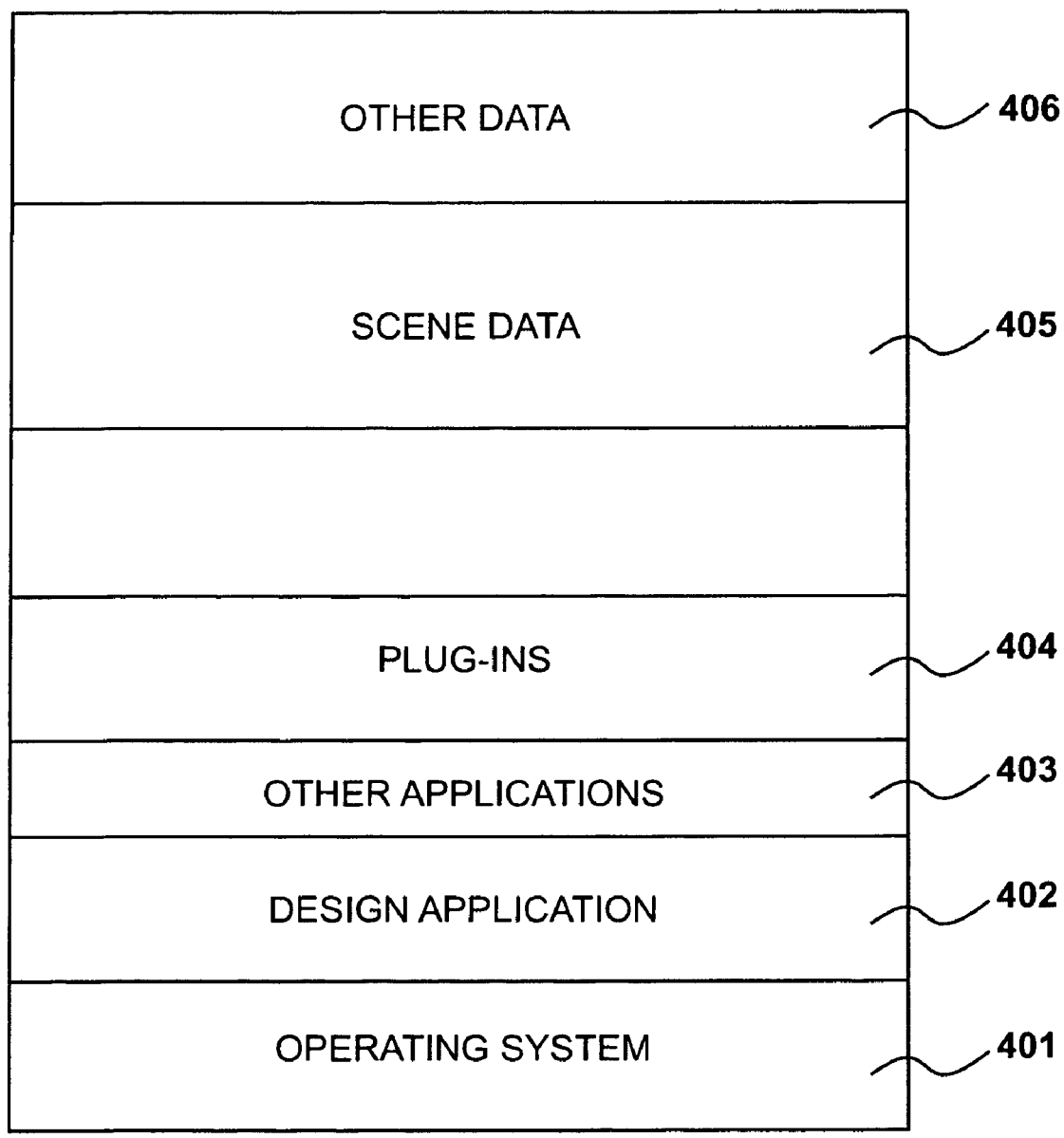
FIG. 4 illustrates an arrangement of program instructions and data in main memory, according to one embodiment of the present invention.

FIG. 4 shows the main memory 205 of FIG. 2, according to one embodiment of the present invention. An operating system 401 provides operating system instructions for common system tasks and device abstraction. The Windows™ XP™ operating system is used. Alternatively, a Macintosh™, Unix™ or Linux™ operating system provides similar functionality. Design application instructions 402 provide instructions for the editing, creation and rendering of three-dimensional object data. Other applications 403 provide common utilities such as internet access, FTP access and email. Plug-ins 404 provide additional instructions for special effects used by the design application 402 when performing rendering.

Scene data, or image data, 405 includes data structures for the storage, animation and configuration of objects that are rendered, edited and modified by the design application instructions 402. Other data 406 includes temporary data structures used by the operating system 401 and other applications 403.

Figure 5:
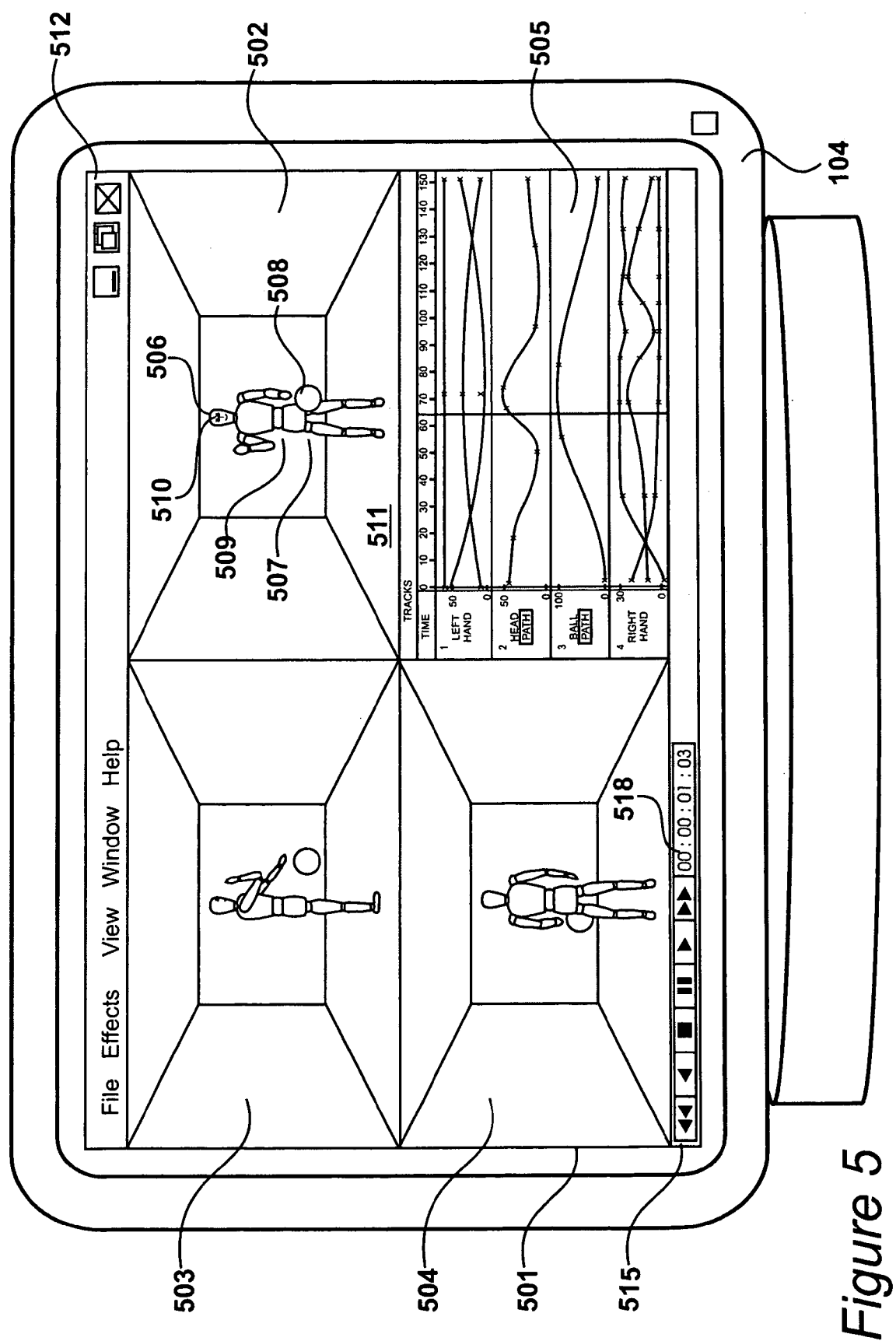
FIG. 5 illustrates a user interface, according to one embodiment of the present invention.

FIG. 5 illustrates a user interface 501, according to one embodiment of the present invention. User interface 501 is presented to the user of processing system 101 on VDU 104 after the user has loaded scene data 805 comprising object data and animation data. The interface comprises a first scene window 502 showing the scene from the front, a second scene window 503 showing the scene from the right-hand side, a third scene window 504 showing the scene from behind and a track window 505. Track window 505 is just one of the various toolboxes available to the user, and others may be accessed using keyboard shortcuts or menu bar 512.

As shown in FIG. 5, the scene 511 currently comprises a character 506 and a ball 507. These are defined by the loaded object data. The animation of this scene comprises character 506 bouncing the ball 507 with his left hand 508 whilst waving with his right hand 509 and moving his head 510. Thus four objects in the scene are controlled by the animation data shown in track window 505.

User interface 501 further comprises navigation buttons 515, that allow a user to progress forwards or backwards through the animation. Time display 518 shows the current time of the animation in hours, minutes, seconds and frames. The display rate in this example is sixty frames per second.

Figure 6:
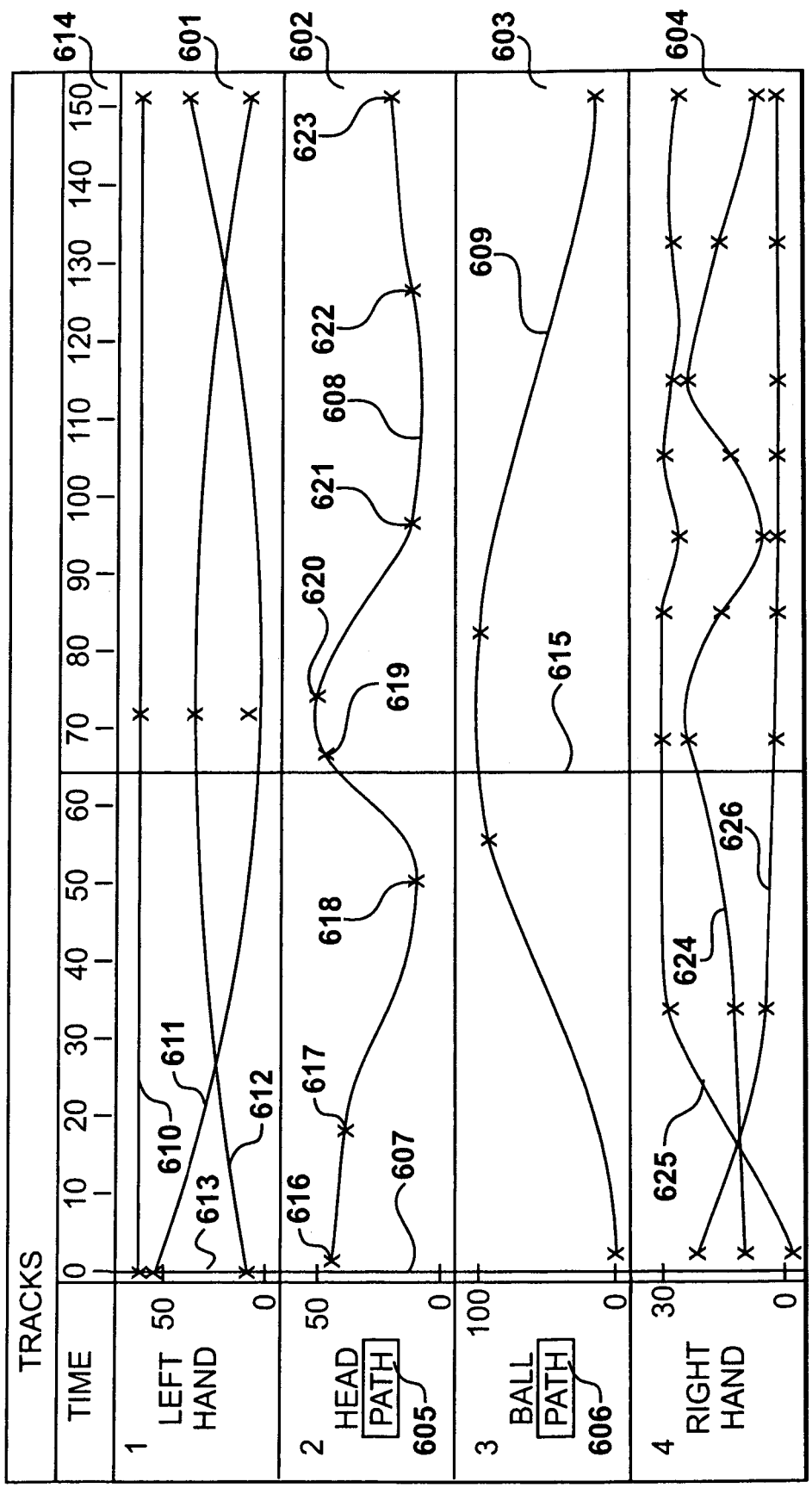
FIG. 6 shows a track window, according to one embodiment of the present invention.

FIG. 6 shows track window 505, according to one embodiment of the present invention. As described with reference to FIG. 5, four objects in the scene are animated. Track 601 contains animation data for left hand 508, track 602 contains animation data for head 510, track 603 contains animation data for ball 507 and track 604 contains animation data for right hand 509. Each track plots animation values against time. Thus the image data for each object in the scene, whether it is a head, hand or ball, is associated with animation data.

Head 510 and ball 507 move along predetermined motion paths, which can be viewed or changed by the user by pressing buttons 605 and 606 respectively. For example, the motion path of head 510 defines a side-to-side movement.

Animation values are given as a percentage of the animation path, as shown by axis 607. The entire path turns the character's head from right to left, and so if the animation value is at zero percent then the head is turned all the way to the right and if it is one hundred percent then it is turned all the way to the left. An animation value of fifty percent means the character is looking straight ahead. Curve 608 in track 602 thus represents the animation data of time values, animation values and a motion path that together cause character 506 to move his head from the centre to the right, quickly back to the centre and then slowly back to the right.

Ball 507's motion path is an up-and-down bouncing movement, wherein an animation value of zero percent puts the ball on the floor and an animation value of one hundred percent means it is at a predetermined height above the ground, in this example at a convenient height for character 506's hand. Thus curve 609 in track 603 represents the animation data of time values, animation values and a motion path that cause the ball to bounce up and down once.

Track 601 shows movement of character 506's left hand 508, which bounces ball 507. Left hand 508 does not follow a predetermined path and its animation data is defined purely in terms of x, y and z co-ordinates within scene 511. Curve 610 gives the x-movement, which is side-to-side as viewed in scene window 502, curve 611 gives y-movement, which is up-and-down as viewed in scene window 502, and curve 612 gives z-movement, which is straight out of scene window 502, or side-to-side in scene window 503. Thus the animation values on axis 613 are not percentages but distances from the centre of scene 511. Track 604 defining movement for right hand 509 also shows x, y and z curves 624, 625 and 626 respectively.

Each of the curves is plotted against time in frames, as shown by timeline 614. Marker 615 indicates the current time, such that scene 511 is currently at the state indicated by each of the curves at the time shown by marker 615. Therefore left hand 508 is about to bounce the ball, which is almost at the top of its motion path, head 510 is looking nearly straight forward and right hand 509 is lifted and about to start waving. Movement of the character's arms is defined either by inverse kinematics or by a motion path that is dependent upon the position of the hand, and is determined by the movement of the hands. Marker 615 can be moved by the user, preferably using mouse 103, to produce the same effect as using navigation buttons 507.

The animation data represented by each of the curves in each of the tracks is defined by keyframes. The keyframes in track 602 are shown by indicators 616, 617, 618, 619, 620, 621 and 622. These are set by the user or by pre-defined animation data such as motion capture or saved animations. At each keyframe the time value and animation value of the animation is defined. Values between the keyframes are then interpolated to produce smooth movement. This is called in-betweening. The terminology derives from the days of hand animation, when a head animator would draw the important or "key" frames and assistants would draw the "in-between frames".

For tracks with three curves, such as track 601, then whenever there is a keyframe for one of the dimensions of movement there must be a keyframe for the other two at the same time. Thus each of the keyframes can be moved independently in animation value but if one of the indicators is moved in time then the corresponding indicators on the other two curves are also moved. This is controlled by a point3 controller, which will be described further with reference to FIG. 8.

Figure 7:
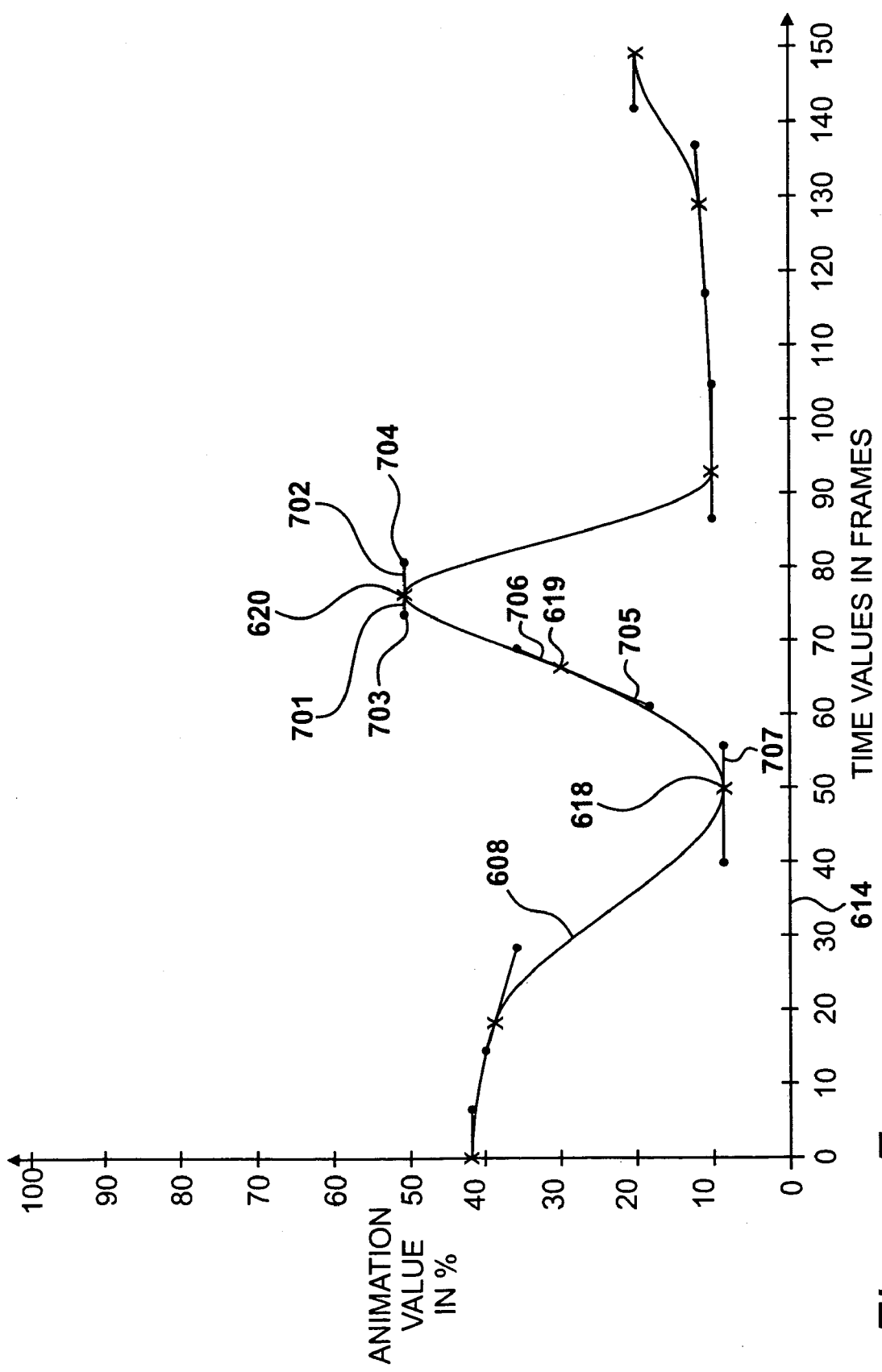
FIG. 7 details a curve of the type shown in FIG. 6, according to one embodiment of the present invention.

FIG. 7 shows curve 608, which is the curve that interpolates between the keyframes in track 602, according to one embodiment of the present invention. Each keyframe indicator is plotted at the position given by the keyframe's time value on axis 614, which has been moved for visual aid, and its animation value on axis 607. Thus keyframe 620 has a time value of 76 frames and an animation value of 51%, giving it a position of (76,51).

Each keyframe indicator has two handles, for example keyframe indicator 620 has handles 701 and 702, which are defined by control points 703 and 704 respectively. A handle is the line extending from a keyframe to one of its control points. Curve 608 is in fact a set of Bezier curves, each Bezier curve going between adjacent keyframe indicators. A Bezier curve is defined by two end points and two control points and is a cubic approximation of the line that goes from one end point through the two control points and finishes at the second end point. The quadrilateral that is defined by these four points is called the convex hull of the Bezier curve and the curve is defined such that it is completely contained within the convex hull.

Thus each handle has a slope and a magnitude. The slope of a handle determines the angle at which the Bezier curve approaches the keyframe indicator and the magnitude determines its velocity.

The slope of a handle is related to its tangent. The tangent of a line is the amount it moves up divided by the amount it moves along. Thus in this case the tangent of a handle is the difference in animation values between the keyframe and the control point divided by the difference in time values between them. Handles coming after their associated keyframe, known as "out handles", for example handle 706, have a slope value of the handle's tangent, and those coming before, known as "in handles", for example handle 705, have a slope value of the negative of the tangent. This is an animation convention. Thus the word tangent, which has a mathematical meaning, should not be confused with the word slope as used herein, which means something different depending on whether the handle is before or after its associated keyframe. For all the indicators shown in FIG. 7 the slopes of the in and out handles for each keyframe are symmetrical, meaning that for each keyframe one handle's slope is the negative of the other. This ensures that the curve is continuous at each keyframe indicator, giving smooth interpolation. The handles can be broken apart by the user to allow sharp corners to be defined if required.

The magnitude of a handle is defined as the distance between its associated keyframe and its control point in time only, and for all the keyframe indicators in FIG. 7 the magnitude is fixed at a third of the distance between the keyframe and the adjacent keyframe. This means that the out handle of one keyframe and the in handle of the next keyframe have identical magnitudes. If the handles at each end of a Bezier curve have identical magnitudes of a third of the distance in time then this means that the velocity along the curve is roughly the same along its length. If this is not true then the animation is faster towards one end of the curve than the other.

Thus, for example, keyframe indicator 619, which is at a position of (66, 30) has two handles 705 and 706. In handle 705 has a slope of −1.6, thus out handle 706 has a slope of 1.6. Indicator 618 is at (50, 9), giving a distance between indicators 618 and 619 of sixteen frames. Thus handle 706, and also out handle 707 of keyframe 618, has a magnitude of 5.3 (a third of sixteen). Indicator 620 is at (76, 51), giving a distance between indicators 619 and 620 of ten frames and so handles 706 and 703 have a magnitude of 3.3. Thus the magnitude of a handle in this embodiment of the present invention is not the same as its length, which is the Euclidean distance between the keyframe and the control point.

The skilled reader will understand that slope and magnitude as described herein are those used by the application described. Changes in the definition of these terms would lead to changes in the algorithms which will be recited below.

The invention as described herein provides a method of adjusting the handles of keyframes in order to provide smooth interpolation. One embodiment of the present invention requires that the magnitudes and slopes be fixed as just described. However the user can set the magnitudes and slopes as required for other purposes, although this will prevent the present invention from being implemented upon those keyframes which have their handles manually adjusted.

FIG. 8 shows track table 801 that contains the values defining the keyframes in track 602, according to one embodiment of the present invention. Column 802 contains a key ID. These IDs are always sequential, such that if a keyframe is added or deleted the keys are renumbered in order according to their time values, which are given in column 803. Animation values are given in column 805, while the state of the keyframes is given in column 809. This indicates "AUTO" for all the keyframes in track 602, showing that all the keyframes have their handles automatically adjusted by the "autotangent" system as will be described further herein. However, if the user had altered the handles of a keyframe it would show a different state indicating, for example, that the handles are symmetrical in slope and in magnitude, or that the handles have been broken, allowing differing slopes.

Columns 805 and 806 give the slope and magnitude respectively of the in handles of each keyframe while columns 807 and 808 give the slope and magnitude respectively of the out handles. The first and last keys do not have in and out handles respectively, since they are only interpolated by a single Bezier curve.

Track 603 has a track table with the same columns containing the definitions of the keyframes in track 603. The tables for tracks 601 and 604 are similar but each row defines a controller which contains three keys. Therefore each row has no key ID but a single controller ID and a single time value. The other columns appear three times each, so that there are three animation values, three in-tangent handle slopes and magnitudes, three out-tangent handle slopes and magnitudes, and three handle states. The controller IDs are sequentially numbered in the same way as the key IDs in table 801. Throughout the rest of this description single keys and point3 controllers will be discussed together, since the animation values of the curves defined by point3 controllers are independent, even though their time values are bound together.

Figure 9:
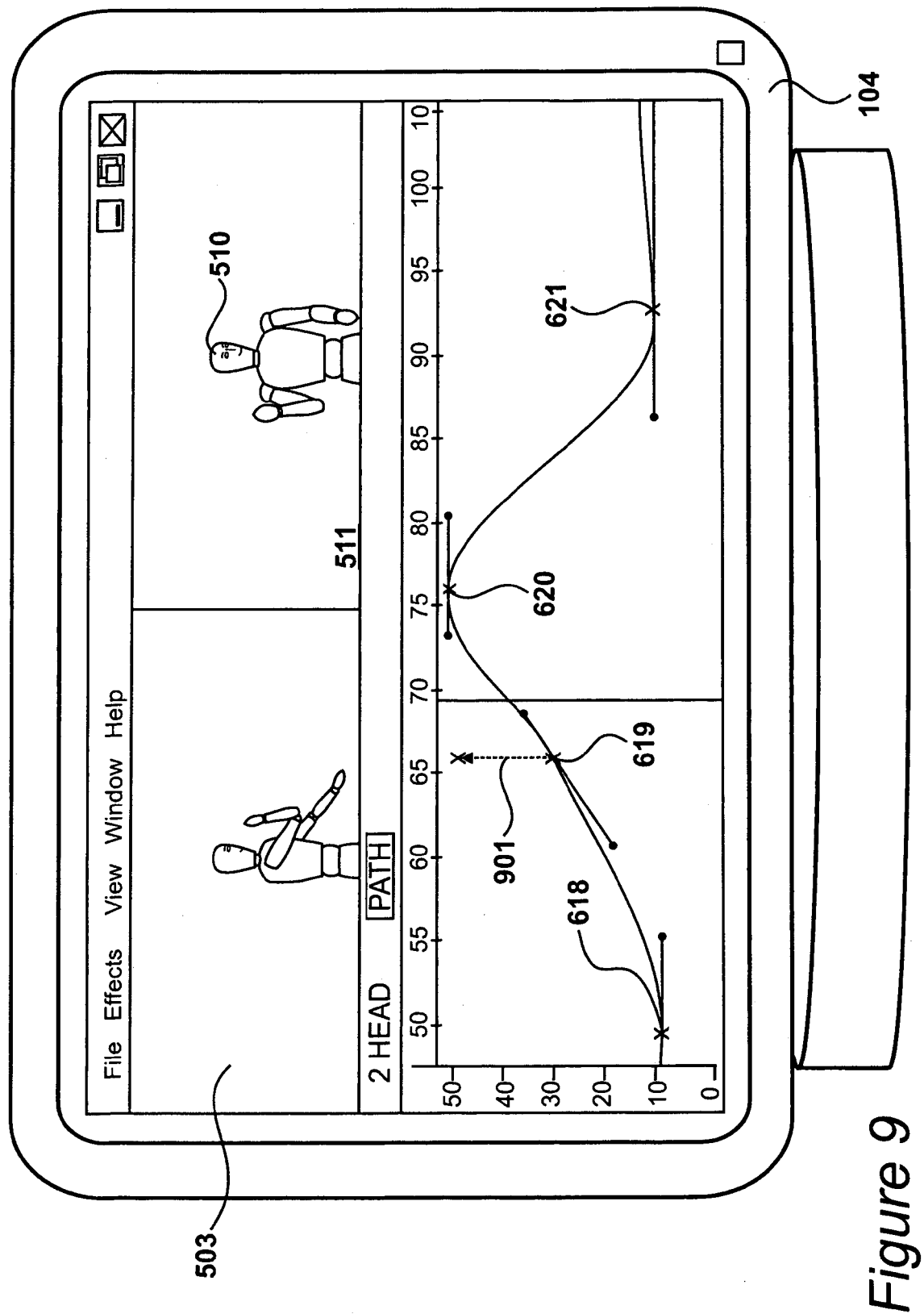
FIG. 9 shows an alternative user interface, according to one embodiment of the present invention.

FIG. 9 shows an alternative version of user interface 501, in which the user wishes to "fine tune" a part of the animation, according to one embodiment of the present invention. The user has zoomed in upon the head 510 of character 506 in scene 511 shown in scene windows 502 and 503. Also, the tracking window 505 has been altered to show only track 602. The user has zoomed in upon a small part of the track, namely that containing keyframe indicators 618 to 621.

In this example the user wishes to move keyframe indicator 619 to a new animation value of 49, as shown by arrow 901. This will make the character turn his head even more quickly back to the centre and then move very slowly a little more to the centre, before moving his head back to the right.

Figure 10:
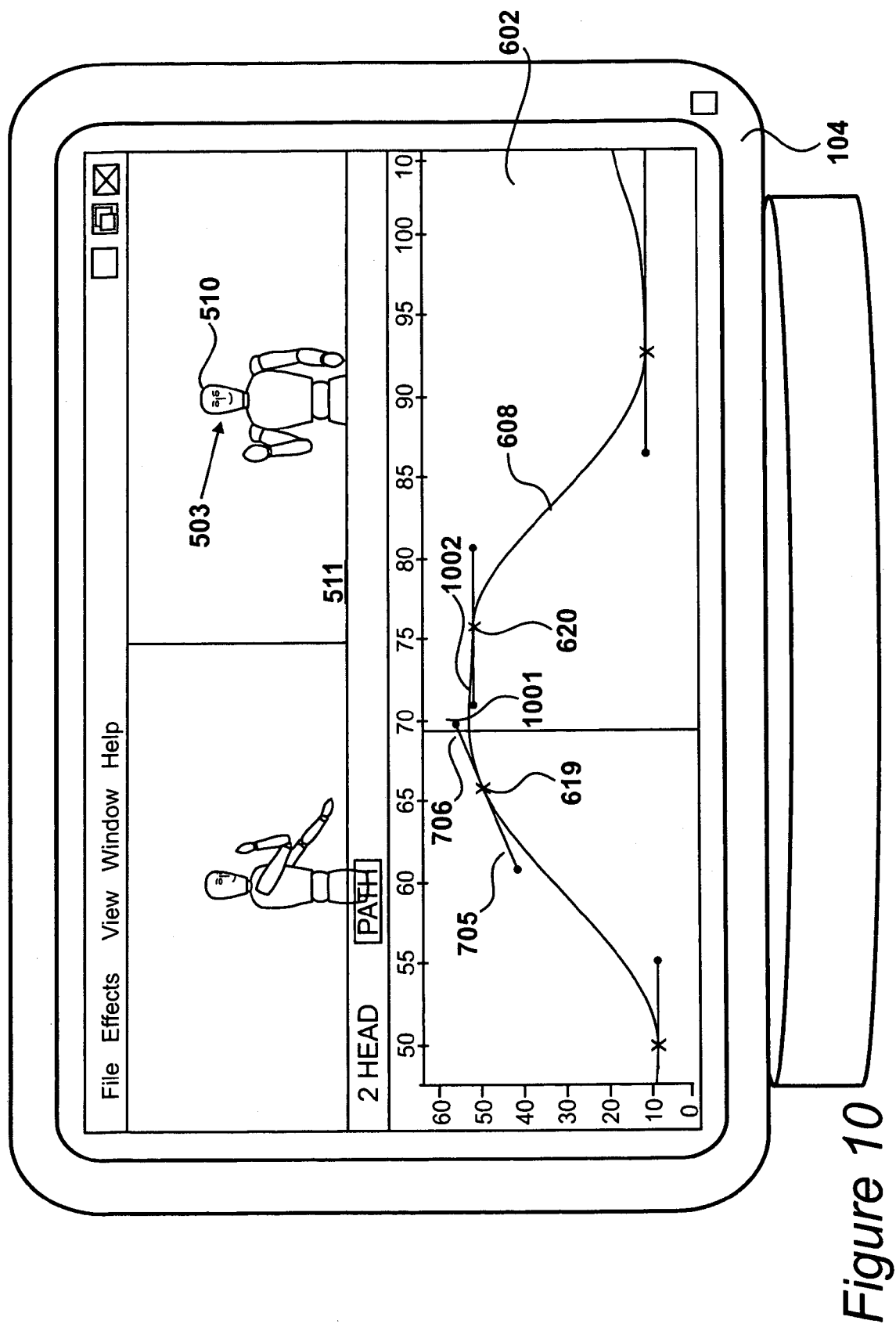
FIG. 10 shows the interface of FIG. 9 after a keyframe has been moved, according to one embodiment of the present invention.

FIG. 10 shows the user interface from FIG. 9 as after the user has moved keyframe indicator 619, according to one embodiment of the present invention. In this example the user has turned "autotangent" off and thus the keyframes and their handles behave as they would in a prior art system. In such a system when a user moves a keyframe indicator the handles do not change their slope or magnitude, as shown by handles 705 and 706. This causes control point 1001 at the end of handle 706 to have a higher animation value than that of the adjacent keyframe 620. By the definition of Bezier curves, this allows curve 608 to "overshoot" the animation value of keyframe 620 as shown at 1002. This in turn causes character 506 to turn his head 510 too far beyond the centre before turning it back. This is an undesirable artefact that in prior art systems can only be corrected by inserting more keyframes or manually altering the handles, either by moving the control points within track 602 or by initiating and using a keyframe toolbox.

Figure 11:
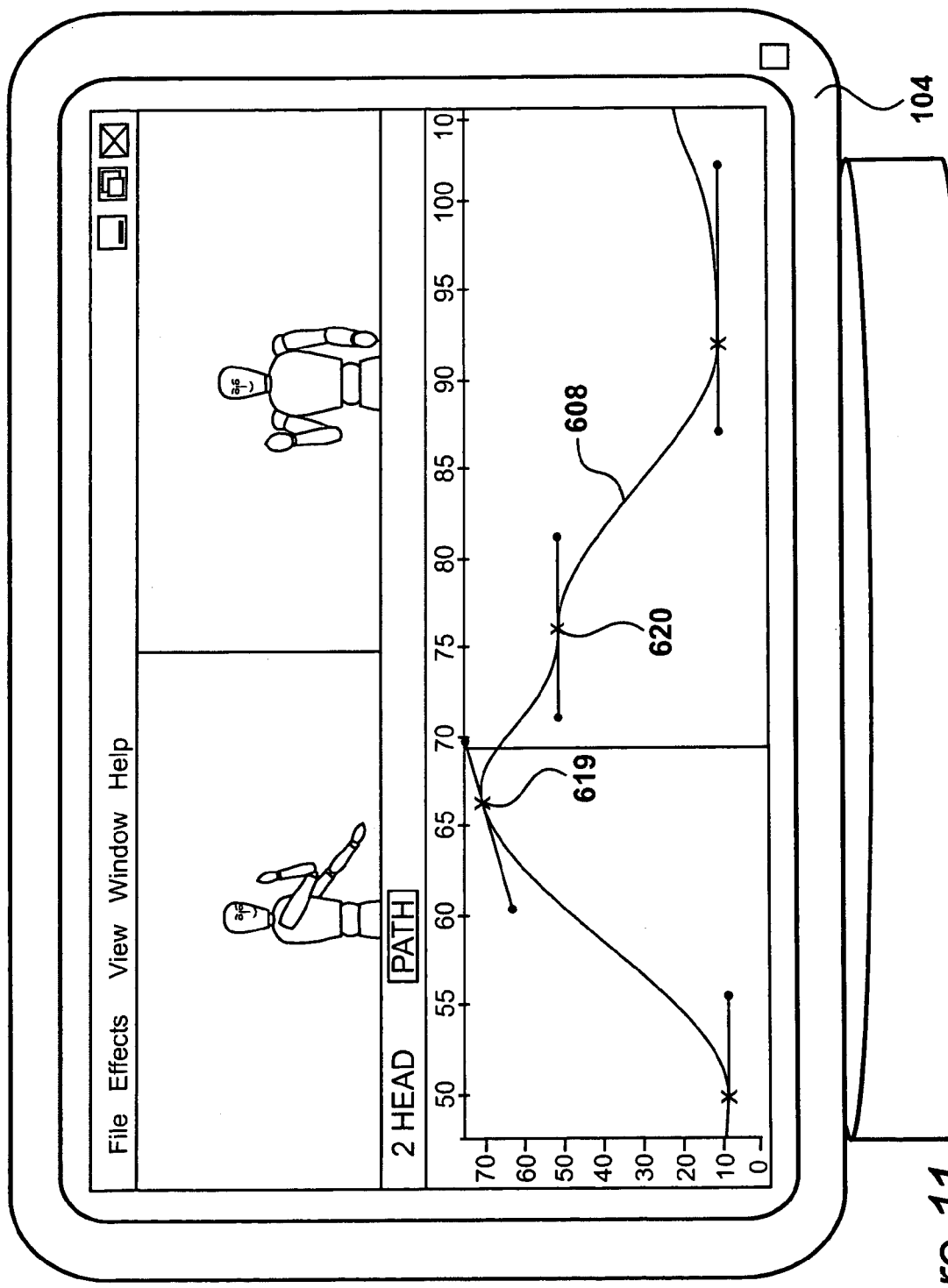
FIG. 11 shows further movement of keyframes, according to one embodiment of the present invention.

FIG. 11 shows user interface 501 again where the user has moved keyframe indicator 619, according to one embodiment of the present invention. In FIG. 11 keyframe indicator 619 has been moved to an animation value of 70, higher than the animation value of adjacent keyframe 620, still with "autotangent" turned off. Again, since the slopes of the handles have not changed this gives an animation curve which although smooth and continuous gives artifacts in the animation. In particular, there is still an overshoot after keyframe 619 and, since the handles of keyframe 620 have a slope of zero the curve makes an "S" shape around the indicator. Both of these artefacts must be corrected manually by the user in prior art systems.

Although the examples of artefacts shown in FIGS. 10 and 11 result from movement of a keyframe's animation value, they result just as often from movement of a keyframe in time.

The skilled reader will understand that the animation curves shown in this example have many fewer keyframes than a typical animation curve, and also a typical animation will usually include many more curves. Thus when a user has to manually correct every artefact resulting from movement of keyframes it is laborious and time-consuming. The invention as described herein provides a method of recalculating the slopes and magnitudes of a keyframe's handles such that the curve does not overshoot the animation values of adjacent keyframes. In other words, for each pair of adjacent keyframes the Bezier curve that interpolates between them has animation values that are larger than the smaller animation value of the two keyframes and smaller than the larger of them.

Figure 12:
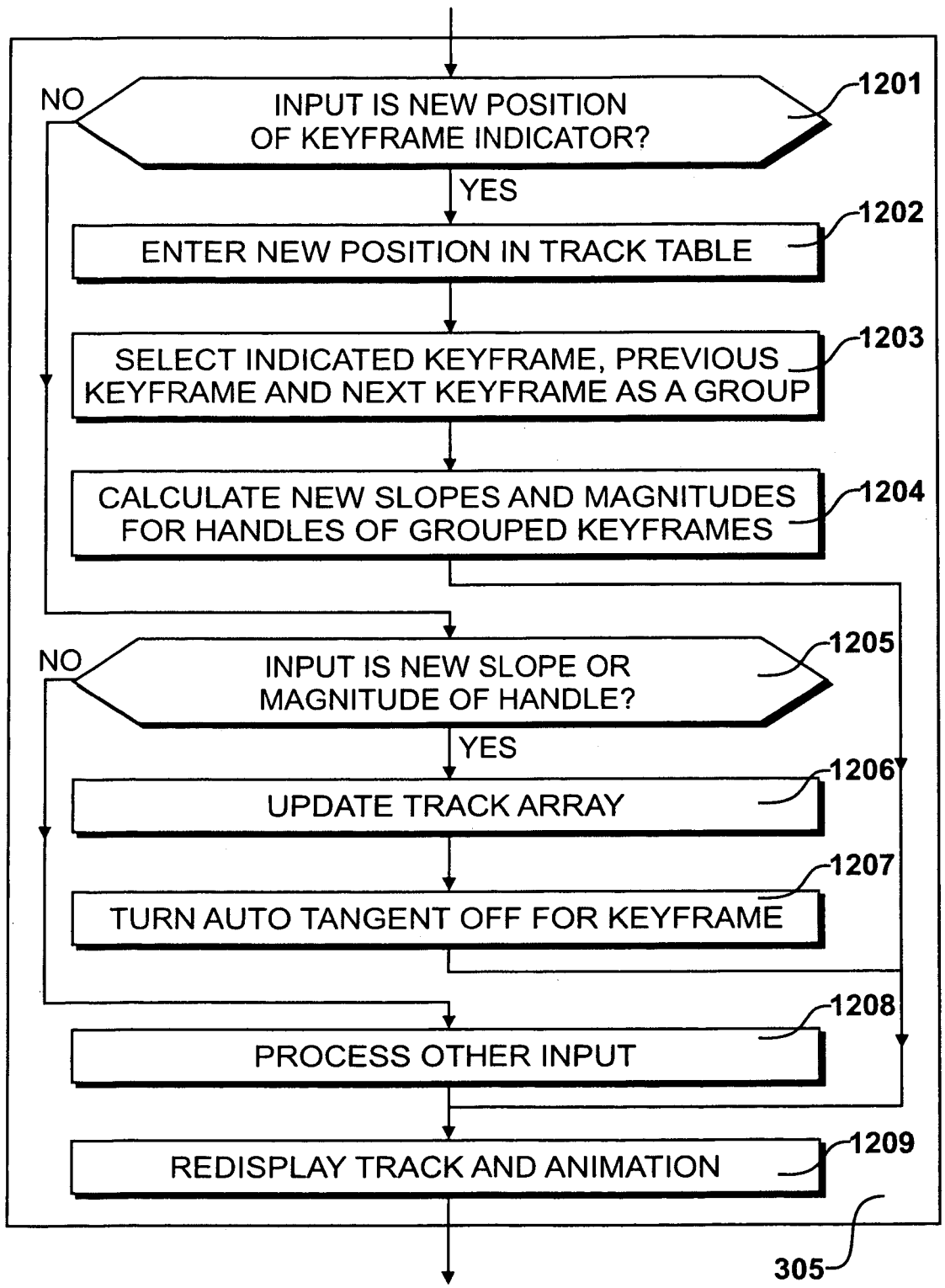
FIG. 12 shows a response to user input, according to one embodiment of the present invention.

FIG. 12 details steps carried out at 307 to respond to user input received at step 305, according to one embodiment of the present invention. At step 1201 a question is asked as to whether the input received indicates a new position of a specified keyframe indicator. If this question is answered in the affirmative then at step 1202 the new time value and animation value are entered in the track table. At step 1203 the specified keyframe and the keyframes immediately previous to and after it in time are selected as a group and at step 1204 new slopes and magnitudes are calculated for the handles of this group of keyframes.

If the question asked at step 1201 is answered in the negative, to the effect that the input does not indicate a new position of a keyframe indicator, then at step 1205 a question is asked as to whether it indicates a new slope or magnitude or a handle, which includes the movement of a control point.

If this question is answered in the affirmative then at step 1206 the track, table is updated and at step 1207 autotangent is turned off for the particular keyframe. This is because the user may want to deliberately produce an artefact that the autotangent will remove, and so if the user sets the control points or handles himself they should not then be changed by the application.

If the question asked at step 1205 is answered in the negative then the input received at step 305 is other animation input and is therefore not specifically relevant to the present invention. This input is processed at step 1208.

At step 1209 the altered track is redisplayed and the positions of the characters and objects in scene 511 are redisplayed according to the new animation data as defined by the animation curves.

Figure 13:
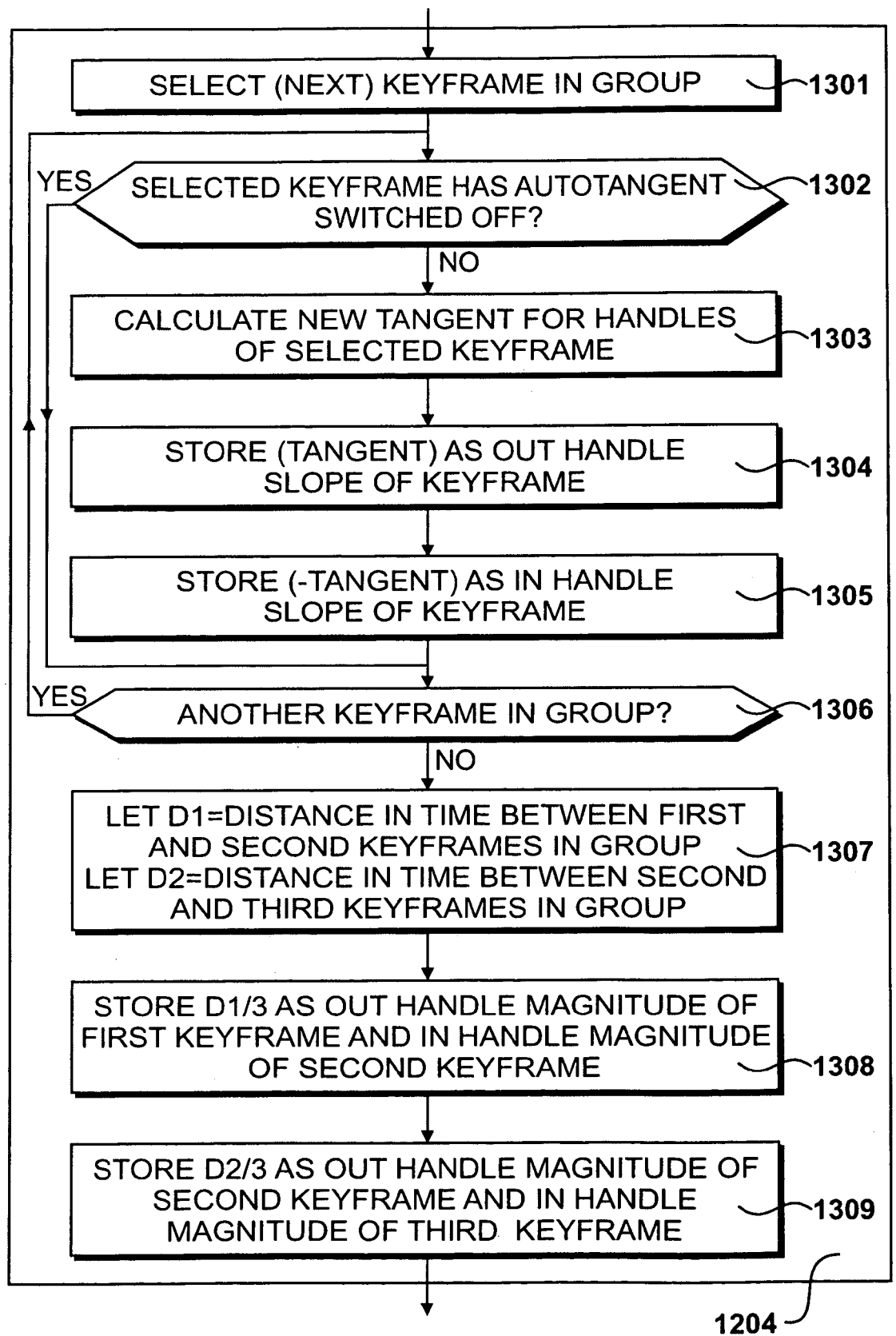
FIG. 13 shows keyframe slope and magnitude selection, according to one embodiment of the present invention.

FIG. 13 details step 1204 at which the slopes and magnitudes of the handles of the keyframes selected as a group at step 1203 are calculated, according to one embodiment of the present invention.

At step 1301 the first keyframe in the group is selected and at step 1302 a question is asked as to whether autotangent is switched off for this particular key. This is indicated by the lack of the word "AUTO" in the keyframe's row and column 809 of the track table. If this question is answered in the negative then no change is made to the animation data for the selected keyframe.

If the question is answered in the affirmative then new magnitudes are calculated for the group of keyframes. If the keyframe indicator that was moved by the user was not moved in time then the magnitudes do not change. However, the calculation is so simple that they are recalculated anyway. At step 1303 a variable D1 is set to be the distance in time between the first and second keyframes in the group and a variable D2 is set to be the distance in time between the second and third. At step 1304 a third of variable D1 is entered as the out handle magnitude of the first keyframe in the group and as the in handle magnitude of the second. At step 1305 a third of variable D2 is entered as the out handle magnitude of the second keyframe of the group and as the in handle magnitude of the third. Thus the magnitudes of the handles are fixed at a third of the distance in time between adjacent keyframes.

Next, at step 1306, a tangent for the handles is calculated using the new time values, animation values and handle magnitudes. Next the new slopes are stored in the track table in the row for the selected key. The tangent value is stored in the out handle slope column 807 at step 1307 and the negative of the tangent is stored in the in handle slope column 805 at step 1308.

At this point, and if the question asked at step 1302 is answered in the affirmative, another question is asked at step 1309 as to whether there is another keyframe in the group. If this is answered in the affirmative then control is returned to step 1301 and the next key is selected.

Figure 14:
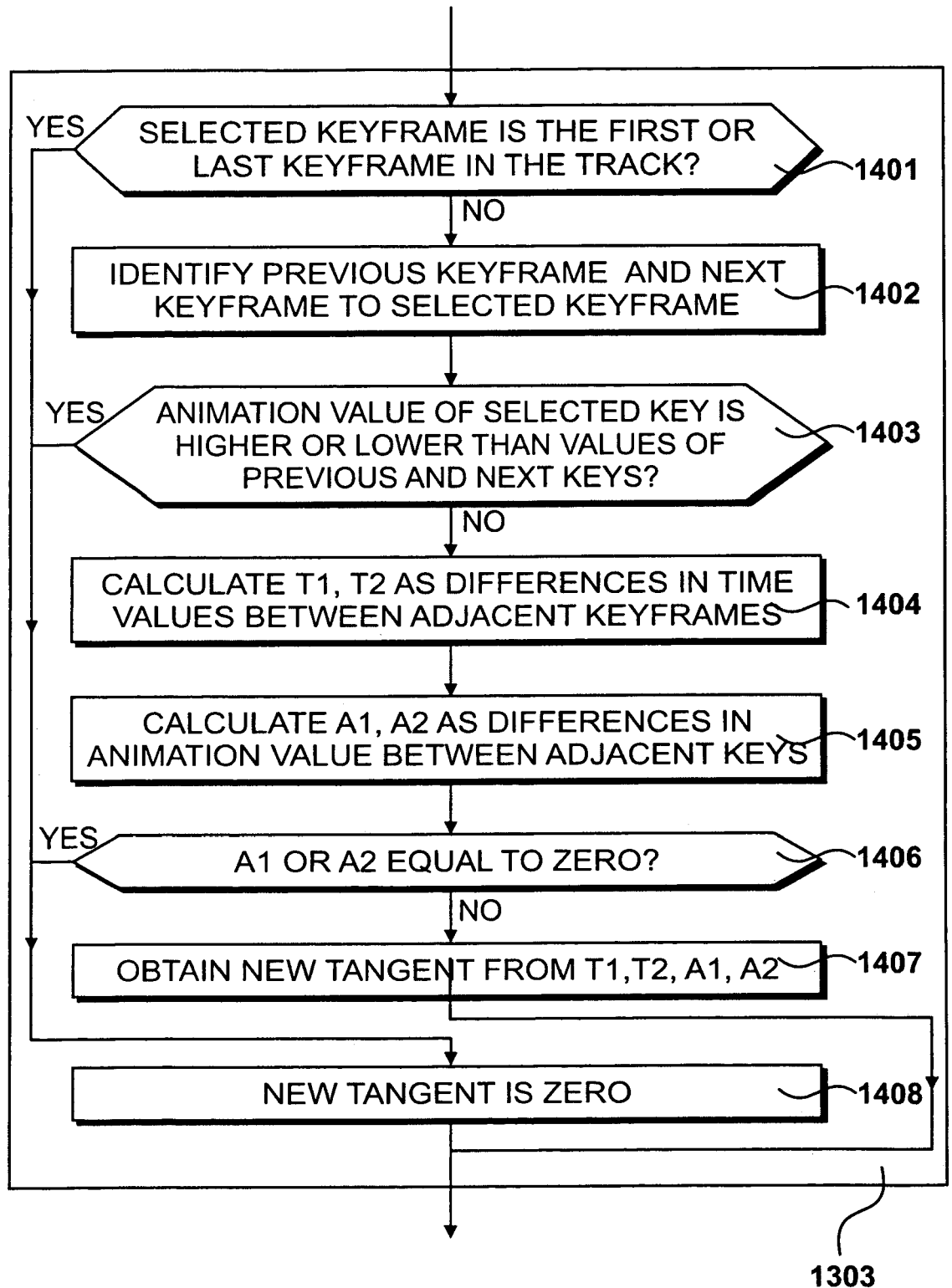
FIG. 14 shows keyframe tangent selection, according to one embodiment of the present invention.

FIG. 14 details step 1306 at which the new tangent of the keyframe selected at step 1301 is calculated, according to one embodiment of the present invention. It will be recalled that a new tangent is calculated for three keyframes—the one which has been moved, the one immediately previous to it in time and the one immediately after it. These keyframes are selected in turn in order to have a new tangent calculated which can be stored as the out handle slope of the keyframe and, negated, as the in handle slope.

At step 1401 a question is asked as to whether the selected keyframe is the first or last in the track. If this question is answered in the negative then at step 1402 the keyframe immediately previous to the selected keyframe in time and the keyframe immediately after it are identified.

At step 1403 a question is asked as to whether the animation value of the selected keyframe is greater than or less than the animation values of both of the keyframes identified at step 1402. If this question is answered in the affirmative then at step 1404 a variable T1 is set to be the difference in time values between the previous keyframe and the selected keyframe and a variable T2 is set to be the difference in time values between the selected keyframe and the next keyframe. Additionally, at step 1405 a variable A1 is set to be the difference in animation values between the previous keyframe and the selected keyframe and a variable A2 is set to be the difference in time values between the selected keyframe and the next keyframe.

At step 1406 a question is asked as to whether either of variables A1 or A2 is equal to zero. If this question is answered in the negative then at step 1407 these values are used to calculate a new tangent for the selected keyframe's handles.

If either of the questions asked at steps 1401 or 1403 are answered in the affirmative or the question asked at step 1407 is answered in the negative then control is directed to step 1408 at which the new tangent is set to be zero. Thus if a keyframe is the first or last in the track its handles are set to have a tangent of zero, giving a smooth "ease in" and "ease out" at the beginning and end of the animation. Also, if a keyframe has a higher or lower animation value than both of its neighbors, meaning it is at a local maximum or minimum of the curve, or if it has an identical animation value to one of its neighbours, then its handles' tangents are set to zero to eliminate overshoot.

Figure 15:
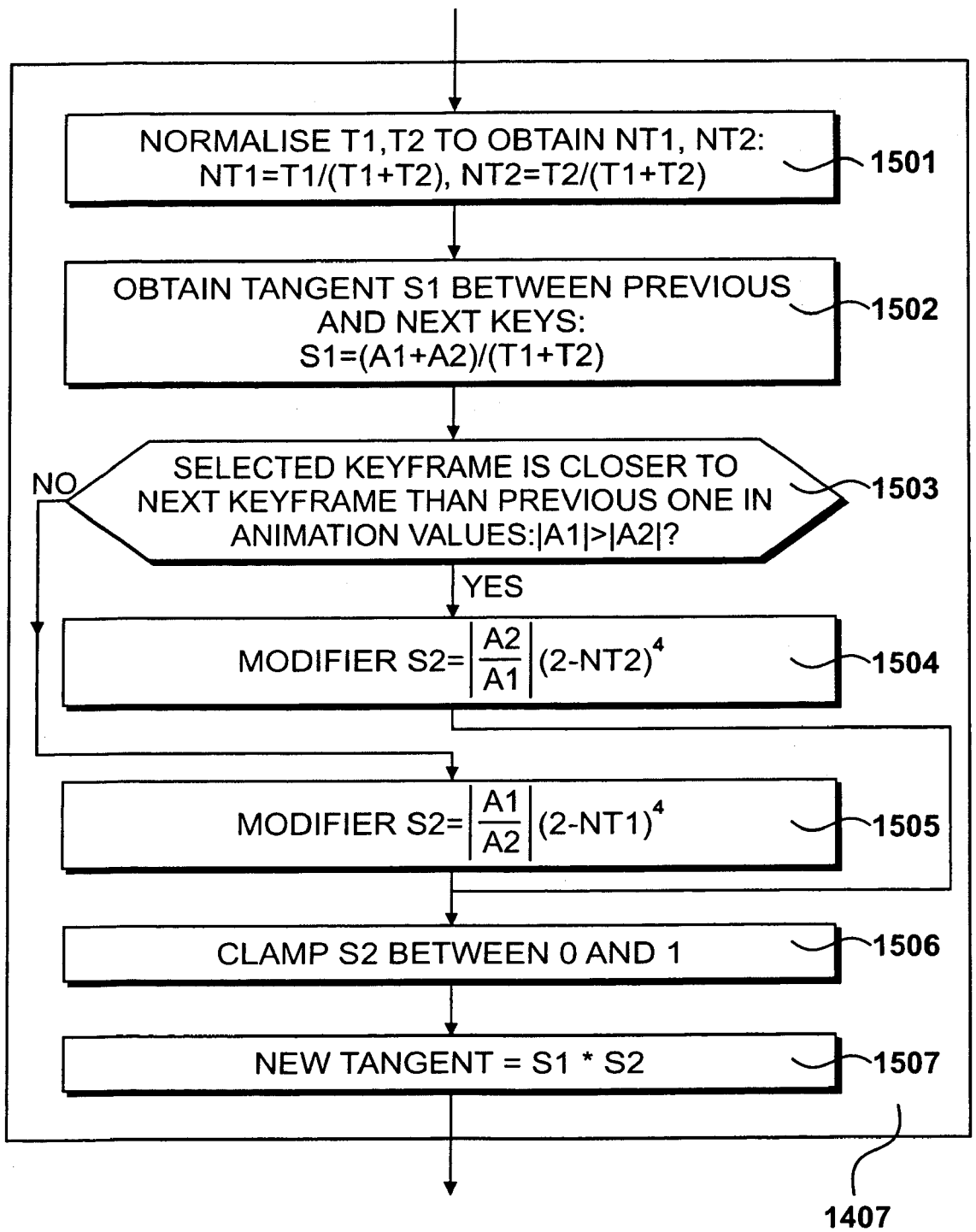
FIG. 15 shows new tangent calculation, according to one embodiment of the present invention.

FIG. 15 details step 1407 at which a new tangent is calculated for the handles of a selected keyframe, according to one embodiment of the present invention. At step 1501 the variables T1 and T2 are normalised by dividing each by the sum of T1 and T2. This produces new variables NT1 and NT2 which sum to one and are in the same proportion to each other as T1 and T2.

At step 1502 the tangent between the keyframes previous to and next to the selected keyframe, as identified at step 1402 and labelled as variable S1. This is the difference in animation values between them, which is simply the sum of A1 and A2, divided by the difference in time between them, which is the sum of T1 and T2.

At step 1503 a question is asked as to whether the animation value of the selected keyframe is closer to the animation value of the next keyframe than that of the previous one. This is achieved by testing whether the absolute value of A1 is greater than the absolute value of A2. If it is answered in the affirmative then a modifier, labelled as S2, is set at step 1504 to be the variable NT2 subtracted from two, all to the power of four, all multiplied by the absolute value of variable A2 and divided by the absolute value of variable A1. If the question is answered in the negative then the modifier S2 is set at step 1505 to be the variable NT1 subtracted from two, all to the power of four, all multiplied by the absolute value of variable A1 and divided by. the absolute value of variable A2. At step 1506 the modifier S2, whichever calculation was used, is clamped to be between zero and one and at step 1507 the new tangent of the handles of the selected keyframe is calculated as the tangent S1 multiplied by the modifier S2.

Modifier S2 is a measure of how close the selected keyframe is to its neighbours. If it is not very close to either then S2 will be clamped to a value of one and thus will not modify the tangent S1 at all. This means that the tangent of the handle of the selected keyframe will be identical to the tangent of the line between the keyframes immediately adjacent to it.

However without the modifier, if the selected keyframe were close enough in animation value or time value to one of its neighbours such that using the tangent S1 for the tangent of its handles would cause one of its control points to be above the largest of the three animation values or below the smallest then this would cause overshoot. Hence the calculations are constructed so that in this situation the modifier S2 alters the tangent such that the control points of the selected keyframe do not exceed the largest of the three animation values, nor are the control points less than the smallest of the three. This, and the fixing of the magnitudes for the handles, ensures that the quadrilateral formed by connecting two keyframe points, the out handle control point of the first and the in handle control point of the second, ie the convex hull of the Bezier curve, is wholly contained within the square that has the two adjacent keyframes at opposite corners. Since a Bezier curve is in turn wholly contained within its convex hull this ensures that each Bezier curve does not overshoot the animation values of its defining keyframes.

Thus there is provided a method of processing image data, in which object. data is associated with animation data, the animation data has a plurality of keyframes, and each of the keyframes has a time value, an animation value and two handles. The method comprises the steps of interpolating between adjacent keyframes to produce a curve, wherein the interpolation is defined by the tangent and the magnitude of the handles of the keyframes, receiving input commands to effect change in at least one of the values of a specified keyframe and recalculating the tangent of the handles of the selected keyframe and the keyframes immediately before and after the selected keyframe to ensure that the interpolation curve does not overshoot the animation values of adjacent keyframes.

Figure 16:
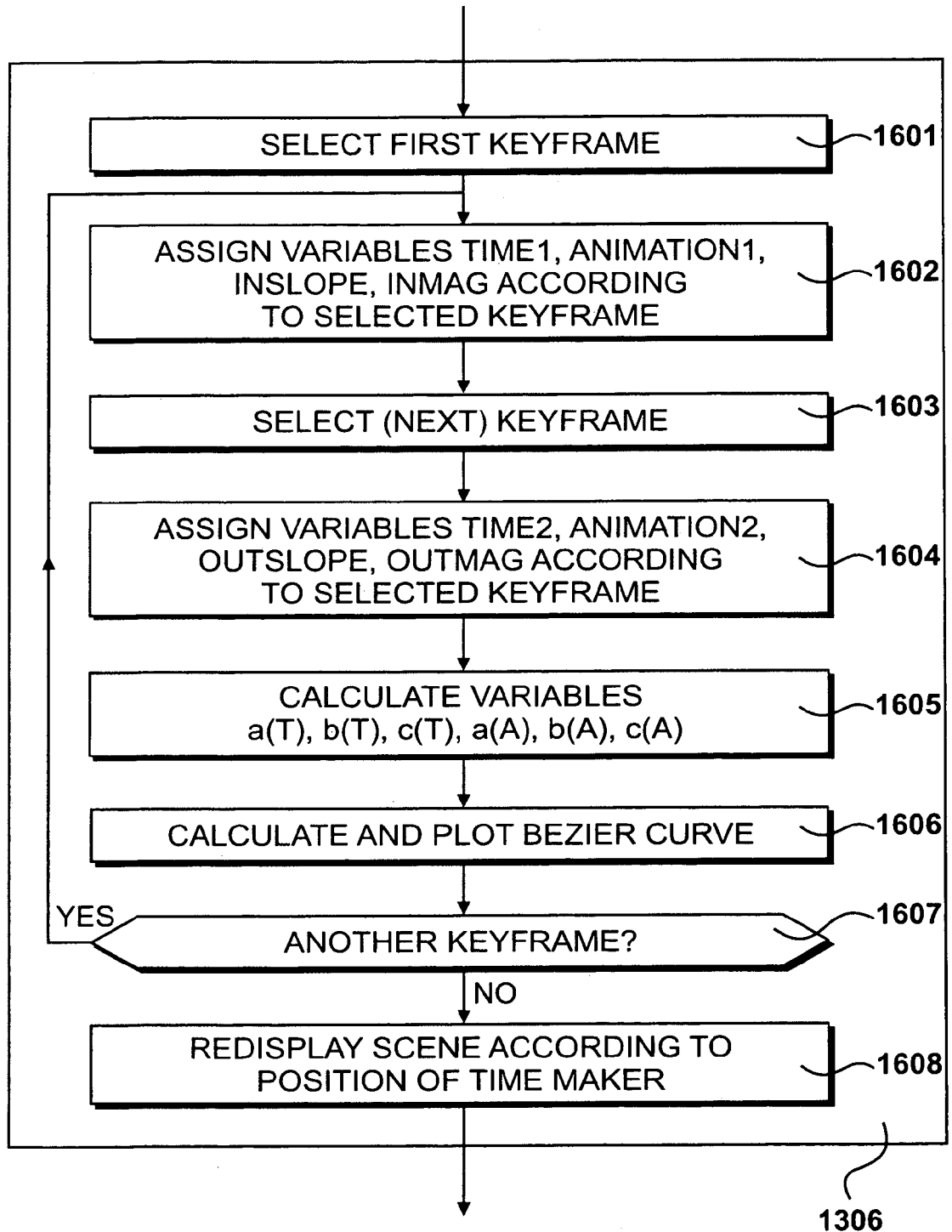
FIG. 16 shows the redisplayed keyframe containing track, according to one embodiment of the present invention.

FIG. 16 details step 1209 at which the track containing the moved keyframe is redisplayed and scene 511 is also redisplayed according to the new animation data, according to one embodiment of the present invention. At step 1601 the first keyframe in the track is selected and at step 1602 four variables TIME1, ANIMATION1, INSLOPE and INMAG are assigned according to the selected keyframe. At step 1603 the next keyframe in the track is selected and at step 1604 four more variables TIME2, ANIMATION2, OUTSLOPE and OUTMAG are assigned according to this selected keyframe.

At step 1605 six variables a(T), b(T), c(T), a(A), b(A) and c(A) are calculated using the variables assigned at steps 1602 and 1604 and at step 1606 Bezier values are calculated and plotted using these new variables.

At step 1607 a question is asked as to whether there are any more keyframes in the track. If this question is answered in the affirmative then control is returned to step 1602 and the first set of variables is redefined according to the selected keyframe before another keyframe is selected at step 1603. If it is answered in the negative then at step 1608 the position of every character and object in scene 511 is calculated and displayed according to the current position of marker 615. As shown in FIG. 6, this marker shows the animation value of every curve at. the time position of the marker. However, this is only a visual aid. The actual animation is displayed either using cached animation values or by recalculating the animation values for each curve as the animation progresses.

Figure 17:
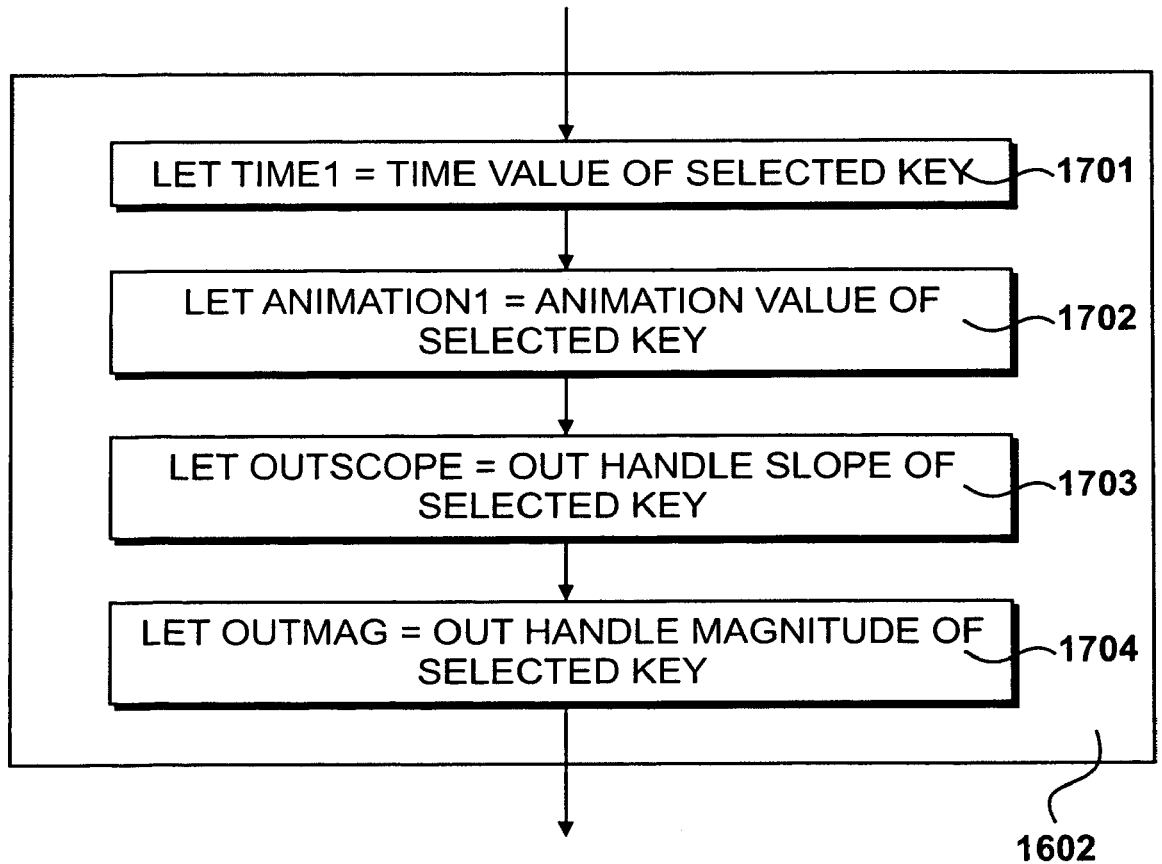
FIG. 17 details an assignment of variables, according to one embodiment of the present invention.

FIG. 17 details step 1602 at which the first set of variables is assigned, according to one embodiment of the present invention. At step 1701 variable TIME1 is set to be the time value of the selected keyframe and at step 1702 variable ANIMATION1 is set to be the animation value of the selected keyframe. At step 1703 the variable OUTSLOPE is set to be the out handle slope of the selected keyframe and at step 1704 the variable OUTMAG is set to be the out handle magnitude of the selected keyframe. All these values are obtained from the track table 801 for the track being redisplayed.

Figure 18:
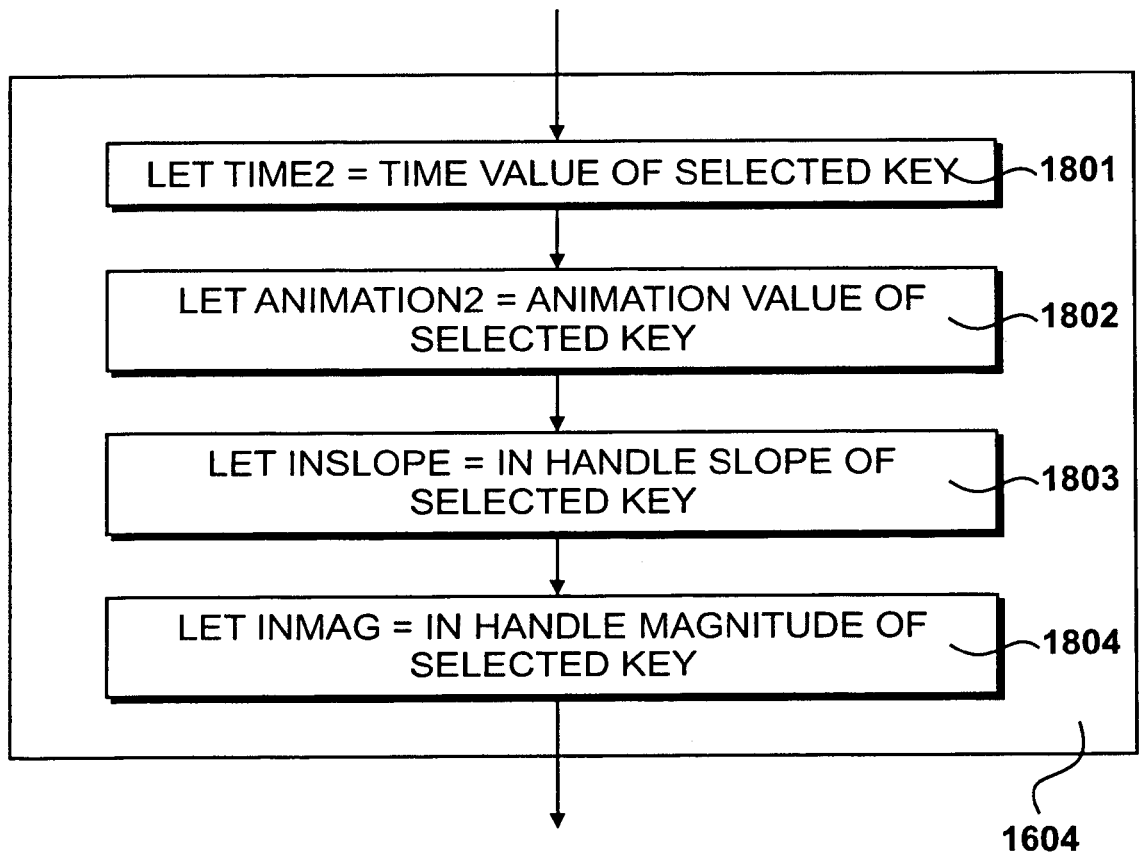
FIG. 18 shows a second set of variables being assigned, according to one embodiment of the present invention.

FIG. 18 details step 1604 at which the second set of variables is assigned, according to one embodiment of the present invention. At step 1801 variable TIME2 is set to be the time value of the selected keyframe and at step 1802 variable ANIMATION2 is set to be the animation value of the selected keyframe. At step 1803 the variable INSLOPE is set to be the in handle slope of the selected keyframe and at step 1804 the variable INMAG is set to be the in handle magnitude of the selected keyframe. All these values are obtained from the track table 801 for the track being redisplayed.

Thus after step 1604 the necessary values to calculate a single Bezier curve between two keyframes have been obtained, ie the time and animation values of both keyframes, the slope and magnitude of the out handle of the first keyframe and the slope and magnitude of the in handle of the second keyframe.

Figure 19:
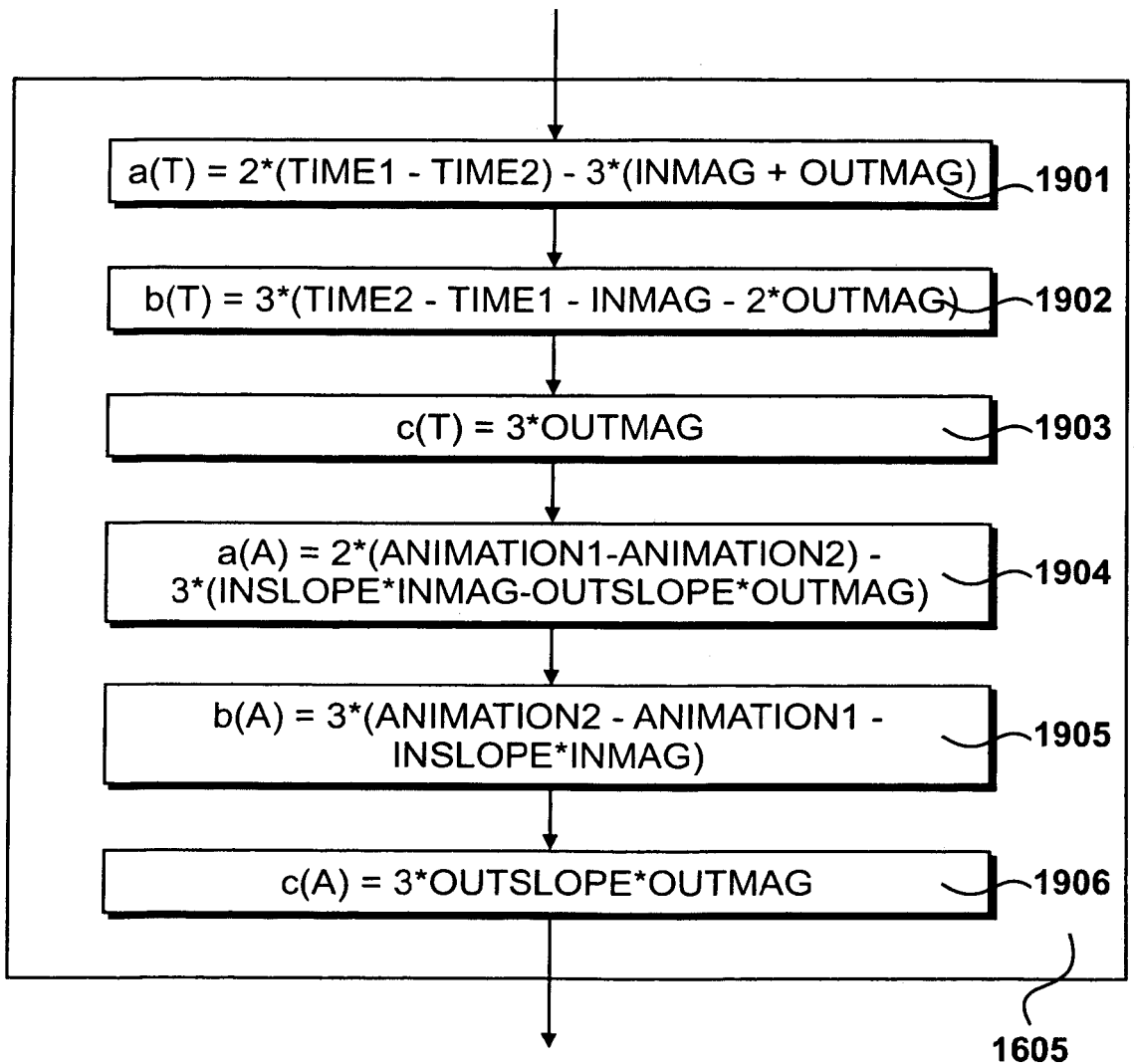
FIG. 19 shows a third set of variables being assigned, according to one embodiment of the present invention.

FIG. 19 details step 1605 at which the third set of variables is calculated, according to one embodiment of the present invention. At step 1901 the variable a(T) is calculated as the sum of INMAG and OUTMAG multiplied by three, subtracted from the product of two and TIME2 subtracted from TIME1.

At step 1902 the variable b(T) is calculated as the product of two and OUTMAG added to INMAG and TIME1, all subtracted from TIME2, all multiplied by three.

At step 1903 the variable c(T) is calculated as the product of three and OUTMAG.

At step 1904 the variable a(A) is calculated as the product of OUTSLOPE and OUTMAG subtracted from the product of INSLOPE and INMAG, all multiplied by three, all subtracted from the product of two and ANIMATION2 subtracted from ANIMATION1.

At step 1905 the variable b(A) is calculated as the product of INSLOPE and INMAG added to ANIMATION1, all subtracted from ANIMATION2, all multiplied by three.

At step 1905 the variable c(A) is calculated as the product of three, OUTSLOPE and OUTMAG.

Figure 20:
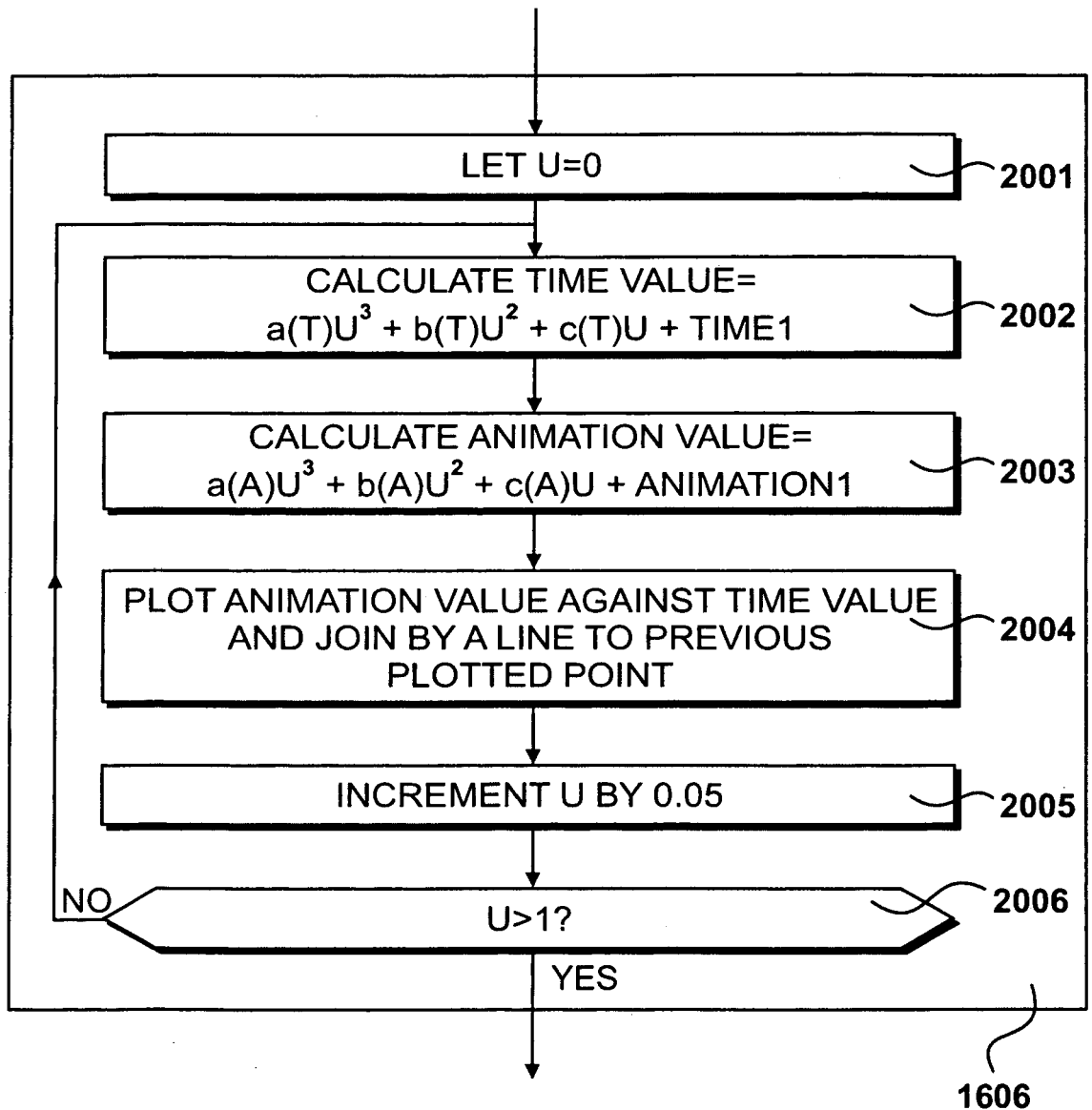
FIG. 20 shows the calculation of a Bezier curve, according to one embodiment of the present invention.

FIG. 20 details step 1606 at which the Bezier curve between the two keyframes is calculated and plotted, according to one embodiment of the present invention. A Bezier curve is a parametric curve, meaning that the input of a single variable into two different equations gives two results. These results are then plotted against each other to give the curve.

At step 2001 a variable U is set to be zero. At step 2002 a time value is calculated and cached as the sum of the following products: a(T) and U cubed, b(T) and U squared, c(T) and U, and TIME1 and 1.

At step 2003 an animation value is calculated and cached as the sum of the following products: a(A) and U cubed, b(A) and U squared, c(A) and U, and TIME1 and 1.

At step 2004 the animation value obtained at step 2003 is plotted against the. time value obtained at step 2004 on the display for the track being changed. A line straight line is drawn between the point just plotted and the previous point. Thus the curve drawn is not strictly a curve but a collection of straight lines.

At step 2005 U is incremented, in this example by 0.05, and at step 2006 a question is asked as to whether U is now greater than one. If this question is answered in the negative then control is returned to step 2002 and the next time value is calculated. If it is answered in the negative then a Bezier curve between the two keyframes has been calculated and plotted and step 1606 is completed.

The exact amount by which U is incremented at step 2004 is an implementation detail, although it must be a number which is a factor of one, for example 0.2, 0.1 or 0.05 but not 0.03. The smaller this number, the more points are plotted; the more points are plotted, the smoother the Bezier curve will be but the longer it will take to calculate. It is also possible that the incrementing of U could be dependent upon the distance in time and/or value between two keyframes, i.e., the further apart they are the smaller an amount U is incremented by. In particular, U could be incremented by the reciprocal of the number of frames between keyframes.

Figure 21:
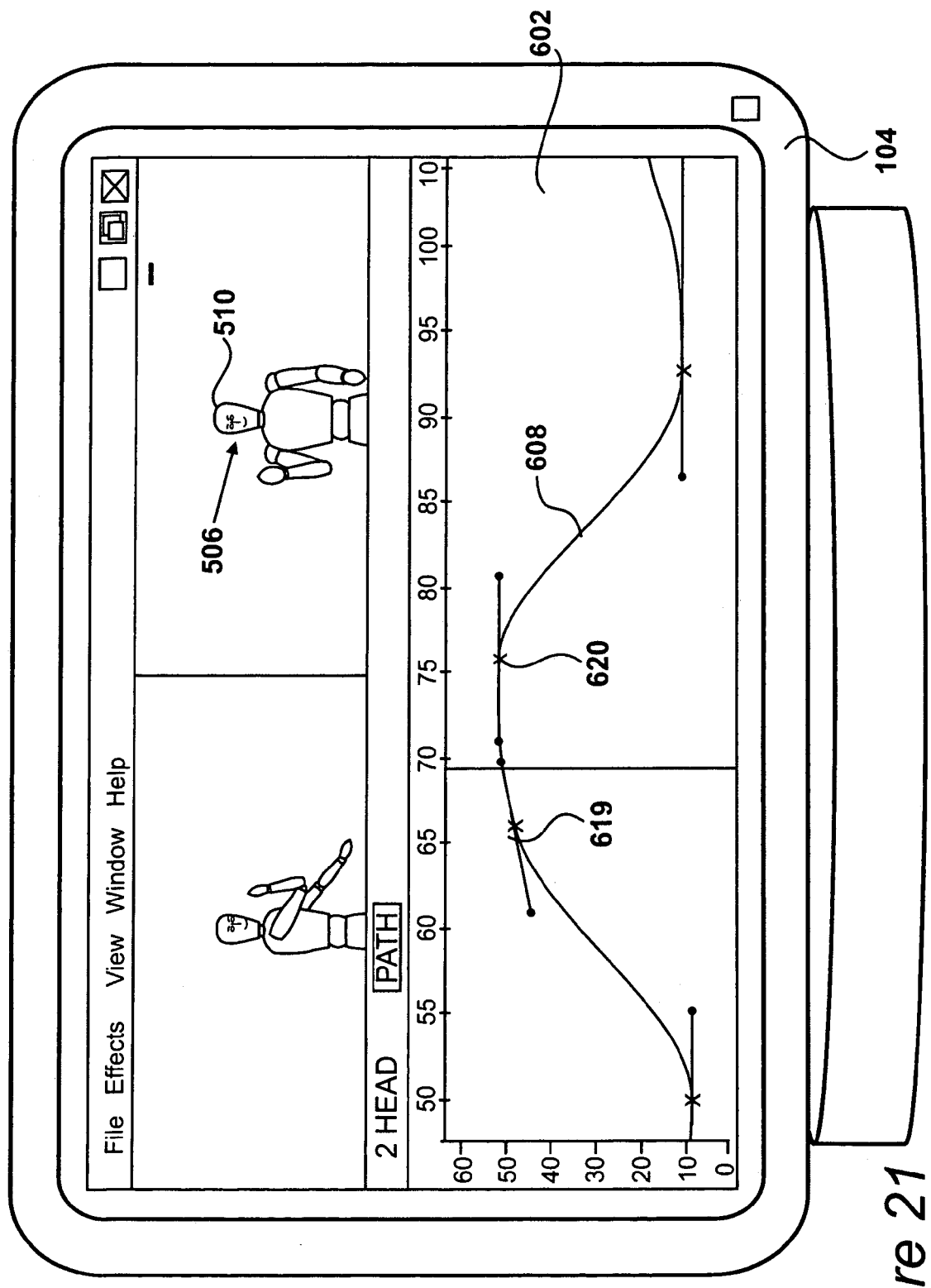
FIG. 21 illustrates a curve smoothing operation, according to one embodiment of the present invention.

FIG. 21 illustrates how the use of the autotangent function as herein described smoothes out the curve shown in FIG. 10, according to one embodiment of the present invention. As can be seen, the tangent of the handles of keyframe 619 has been set such that curve 608 no longer overshoots the animation value of keyframe indicator 620, thus giving a smooth animation without adjustment by the operator.

Figure 22:
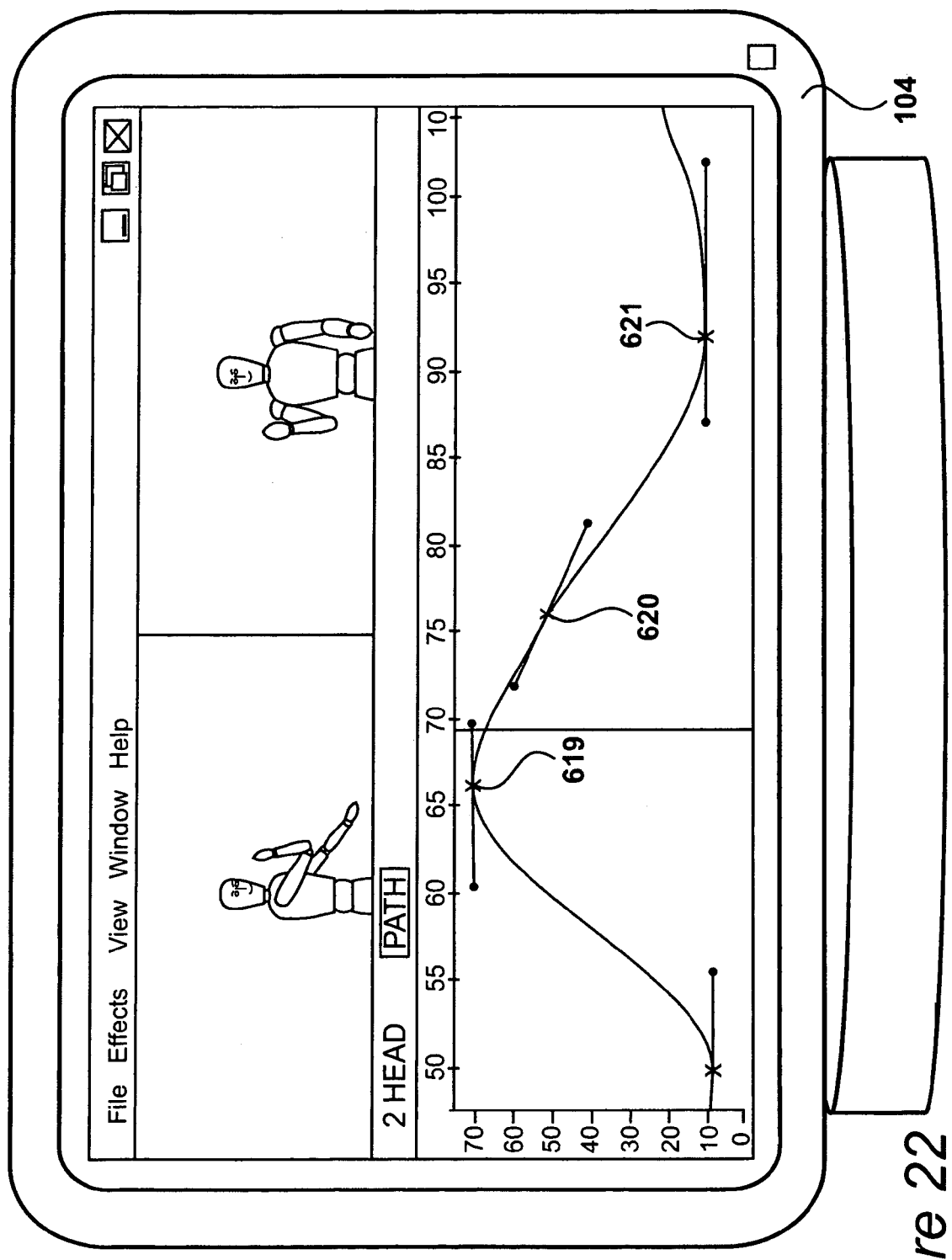
FIG. 22 shows further curve smoothing, according to one embodiment of the present invention.

FIG. 22 illustrates how the use of the autotangent function as herein described smoothes out the curve shown in FIG. 11, according to one embodiment of the present invention. As can be seen, the tangent of the handles of keyframe 618 is now zero, eliminating the overshoot, and the tangent of the handles of keyframe 619 has been set to the same as the tangent between keyframes 619 and 621, thus ensuring smooth animation.

The invention claimed is:

1. A computer readable medium storing instructions for causing a computer to process image data and produce a modified curve representing animation data, by performing the steps of:
receiving an input specifying a modification to a first keyframe indicator, the first keyframe indicator including a first handle extending from the first keyframe indicator to a first control point partially defining a first curve;
identifying a second keyframe indicator connected to the first keyframe indicator by the first curve, the second keyframe indicator including a second handle extending from the second keyframe indicator to a second control point partially defining the first curve;
adjusting the first handle and the second handle based on the modification to produce a modified first handle and a modified second handle, wherein the adjustments to the first handle and to the second handle, respectively, comprise calculating a modified slope for the first handle equal to a tangent of the first handle scaled by negative one and calculating a modified slope for the second handle equal to a tangent of the second handle; and
computing a modified first curve between the first keyframe indicator and the second keyframe indicator based on the modified first handle and the modified second handle, wherein the modified first curve does not overshoot the second keyframe indicator.

2. The computer readable medium of claim 1, further comprising the steps of:
identifying a third keyframe indicator, including a third handle and a fourth handle, the third handle extending from the first keyframe indicator to a third control point, wherein the third keyframe indicator is connected to the first keyframe indicator by a second curve partially defined by the third control point;
adjusting the third handle and the fourth handle based on the modification to produce a modified third handle and a modified fourth handle; and
computing a modified second curve between the first keyframe indicator and the third keyframe indicator based on the modified third handle and the modified fourth handle, wherein the modified second curve does not overshoot the third keyframe indicator.

3. The computer readable medium of claim 2, wherein a slope of the first handle and a slope of the second handle are calculated to be zero when animation values of the second keyframe indicator and the third keyframe indicator are both either greater than or less than an animation value of the first keyframe indicator.

4. The computer readable medium of claim 2, wherein the adjustment of the first handle and the second handle constrains the first control point and the third control point within a range bounded by a largest animation value and a smallest animation value, wherein the largest animation value and the smallest animation value are determined by comparing animation values of the first keystone indicator, the second keystone indicator, and the third keystone indicator.

5. The computer readable medium of claim 1, wherein a magnitude of each handle is equal to a length of the handle measured in units of time.

6. The computer readable medium of claim 5, wherein the adjustment of the first handle and the second handle comprises calculating the magnitude of the first handle and the magnitude of the second handle to each be one third of a distance representing a measurement between the first keyframe indicator and the second keyframe indicator.

7. The computer readable medium of claim 1, wherein a slope of the first handle is calculated to be zero when animation value of the first keyframe indicator is identical to an animation value of another keyframe indicator connected to the first keyframe indicator by a curve.

8. The computer readable medium of claim 1, wherein slopes all handles of the first keyframe indicator are calculated to be zero when the first keyframe indicator is a first or a last keyframe indicator in an animation track.

9. A method of processing image data to produce a modified curve representing animation data, comprising:
receiving an input specifying a modification to a first keyframe indicator, the first keyframe indicator including a first handle extending from the first keyframe indicator to a first control point partially defining a first curve;
identifying a second keyframe indicator connected to the first keyframe indicator by the first curve, the second keyframe indicator including a second handle extending from the second keyframe indicator to a second control point partially defining the first curve;
adjusting the first handle and the second handle based on the modification to produce a modified first handle and a modified second handle, wherein the adjustments to the first handle and to the second handle, respectively, comprise calculating a modified slope for the first handle equal to a tangent of the first handle scaled by negative one and calculating a modified slope for the second handle equal to a tangent of the second handle; and
computing a modified first curve between the first keyframe indicator and the second keyframe indicator based on the modified first handle and the modified second handle, wherein the modified first curve does not overshoot the second keyframe indicator.

10. The method of claim 9, further comprising the steps of:
identifying a third keyframe indicator, including a third handle and a fourth handle, the third handle extending from the first keyframe indicator to a third control point, wherein the third keyframe indicator is connected to the first keyframe indicator by a second curve partially defined by the third control point;
adjusting the third handle and the fourth handle based on the modification to produce a modified third handle and a modified fourth handle; and
computing a modified second curve between the first keyframe indicator and the third keyframe indicator based on the modified third handle and the modified fourth handle, wherein the modified first curve does not overshoot the third keyframe indicator.

11. The method of claim 10, wherein the adjustment of the first handle and the second handle ensures that the first control point and the third control point are within a range bounded by a largest animation value and a smallest animation value, wherein the largest animation value and the smallest animation value are determined by comparing animation values of the first keystone indicator, the second keystone indicator, and the third keystone indicator.

12. The method of claim 9, wherein the adjustment of the first handle and the second handle comprises calculating a magnitude of the first handle and a magnitude of the second handle to each be one third of a distance representing a measurement between the first keyframe indicator and the second keyframe indicator.

13. A system for processing image data to produce a modified curve representing animation data, the system comprising:
means for receiving an input specifying a modification to a first keyframe indicator, the first keyframe indicator including a first handle extending from the first keyframe indicator to a first control point partially defining a first curve;
means for identifying a second keyframe indicator connected to the first keyframe indicator by the first curve, the second keyframe indicator including a second handle extending from the second keyframe indicator to a second control point partially defining the first curve;
means for calculating a modified slope for the first handle equal to a tangent of the first handle scaled by negative one and for calculating a modified slope for the second handle equal to a tangent of the second handle; and
means for adjusting the first handle and the second handle based on the modified slope for the first handle and the modified slope for the second handle, respectively, to produce a modified first handle and a modified second handle; and
means for computing a modified first curve between the first keyframe indicator and the second keyframe indicator based on the modified first handle and the modified second handle.

14. The system of claim 13, wherein the adjustment of the first handle and the second handle constrains the first control point and the third control point within a range bounded by a largest animation value and a smallest animation value, wherein the largest animation value and the smallest animation value are determined by comparing animation values of the first keystone indicator, the second keystone indicator, and the third keystone indicator.

15. The system of claim 14, wherein a slope of the first handle and a slope of the second handle are calculated to be zero when animation values of the second keyframe indicator and the third keyframe indicator are both either greater than or less than an animation value of the first keyframe indicator.

16. The system of claim 13, further comprising means for calculating a magnitude of the first handle and a magnitude of the second handle as one third of a distance representing a measurement between the first keyframe indicator and the second keyframe indicator.

17. The system of claim 13, wherein a slope of the first handle is calculated to be zero when animation value of the first keyframe indicator is identical to an animation value of another keyframe indicator connected to the first keyframe indicator by a curve.

* * * * *